Jan. 16, 1940.  C. W. GREEN  2,187,200
CASH REGISTER
Original Filed March 27, 1931    15 Sheets-Sheet 4

Inventor
Charles W. Green
By
*Carl Benst*
His Attorney

Jan. 16, 1940.  C. W. GREEN  2,187,200
CASH REGISTER
Original Filed March 27, 1931   15 Sheets-Sheet 5

Inventor
Charles W. Green
By
His Attorney

Jan. 16, 1940.　　　　C. W. GREEN　　　　2,187,200
CASH REGISTER
Original Filed March 27, 1931　　15 Sheets-Sheet 7

Inventor
Charles W. Green
By
Carl Benst
His Attorney

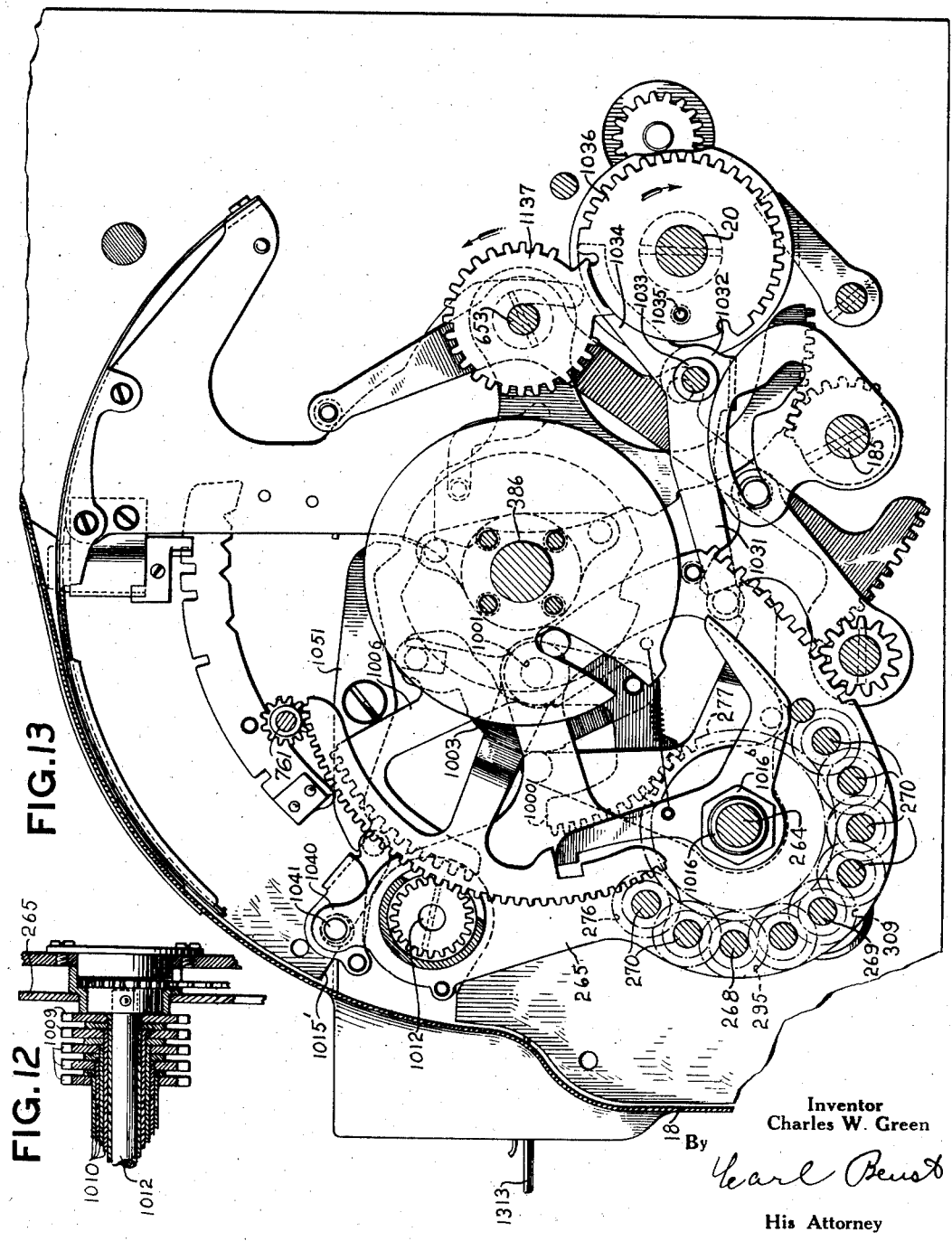

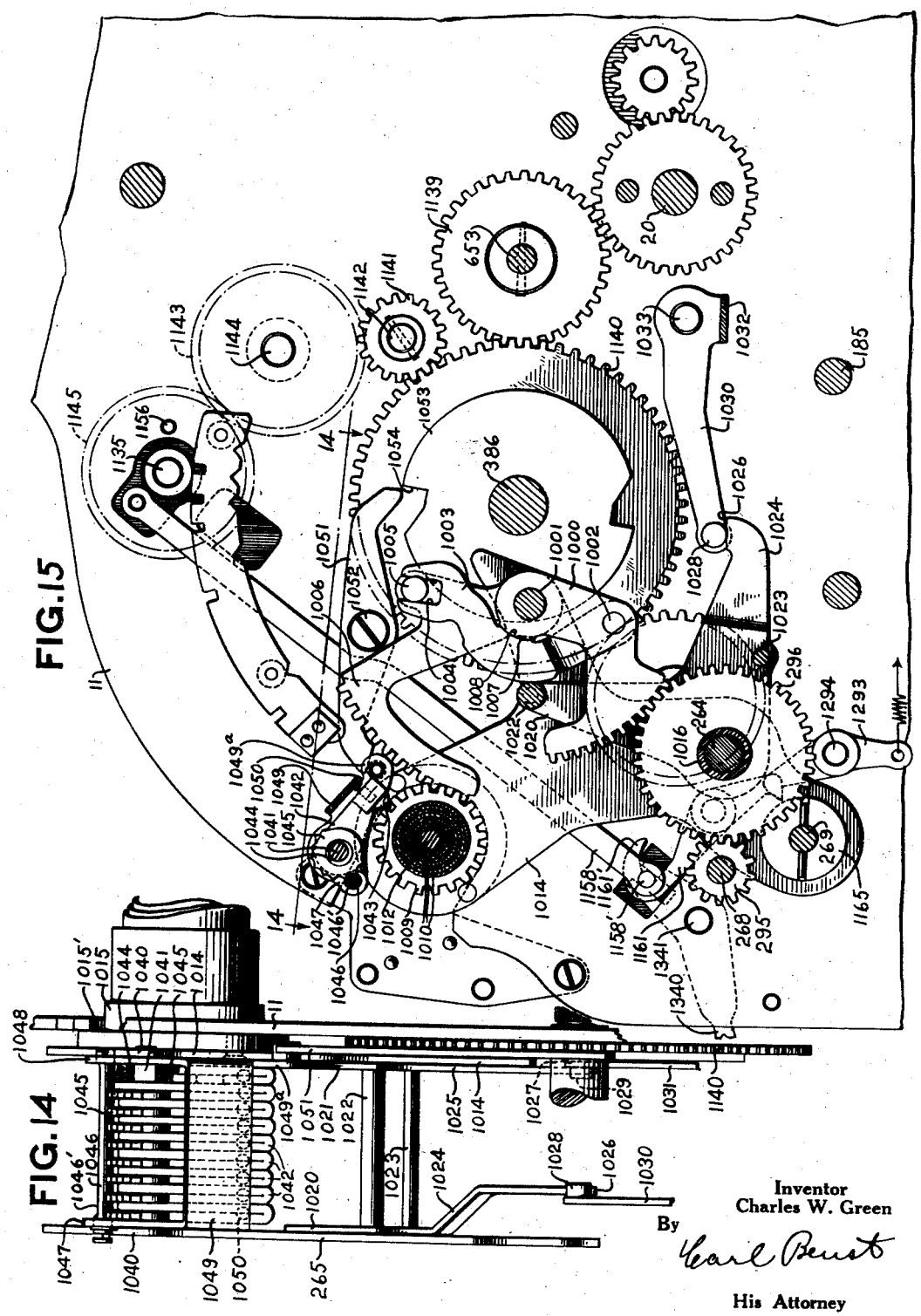

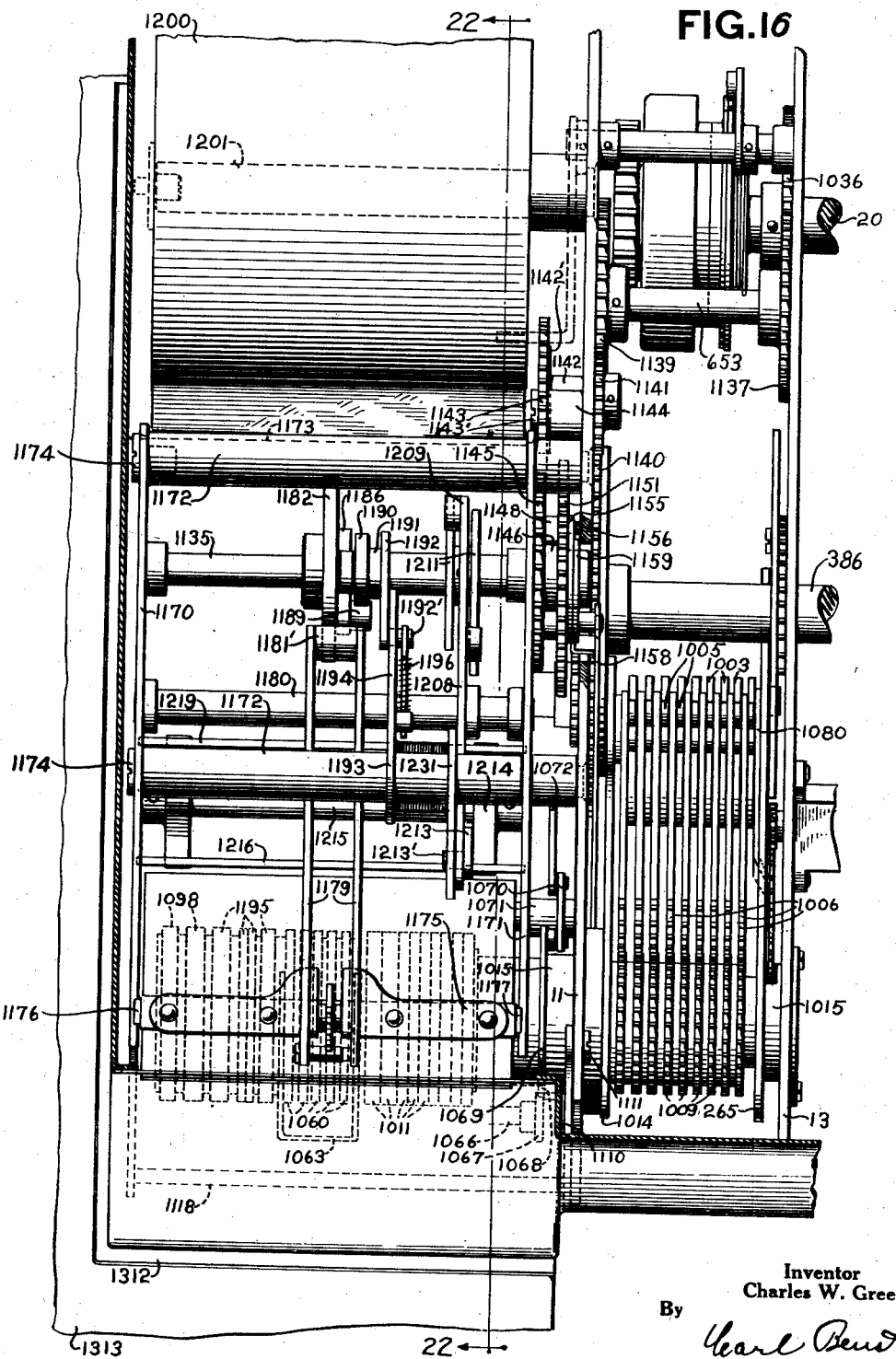

Jan. 16, 1940.         C. W. GREEN         2,187,200
                       CASH REGISTER
         Original Filed March 27, 1931    15 Sheets-Sheet 11
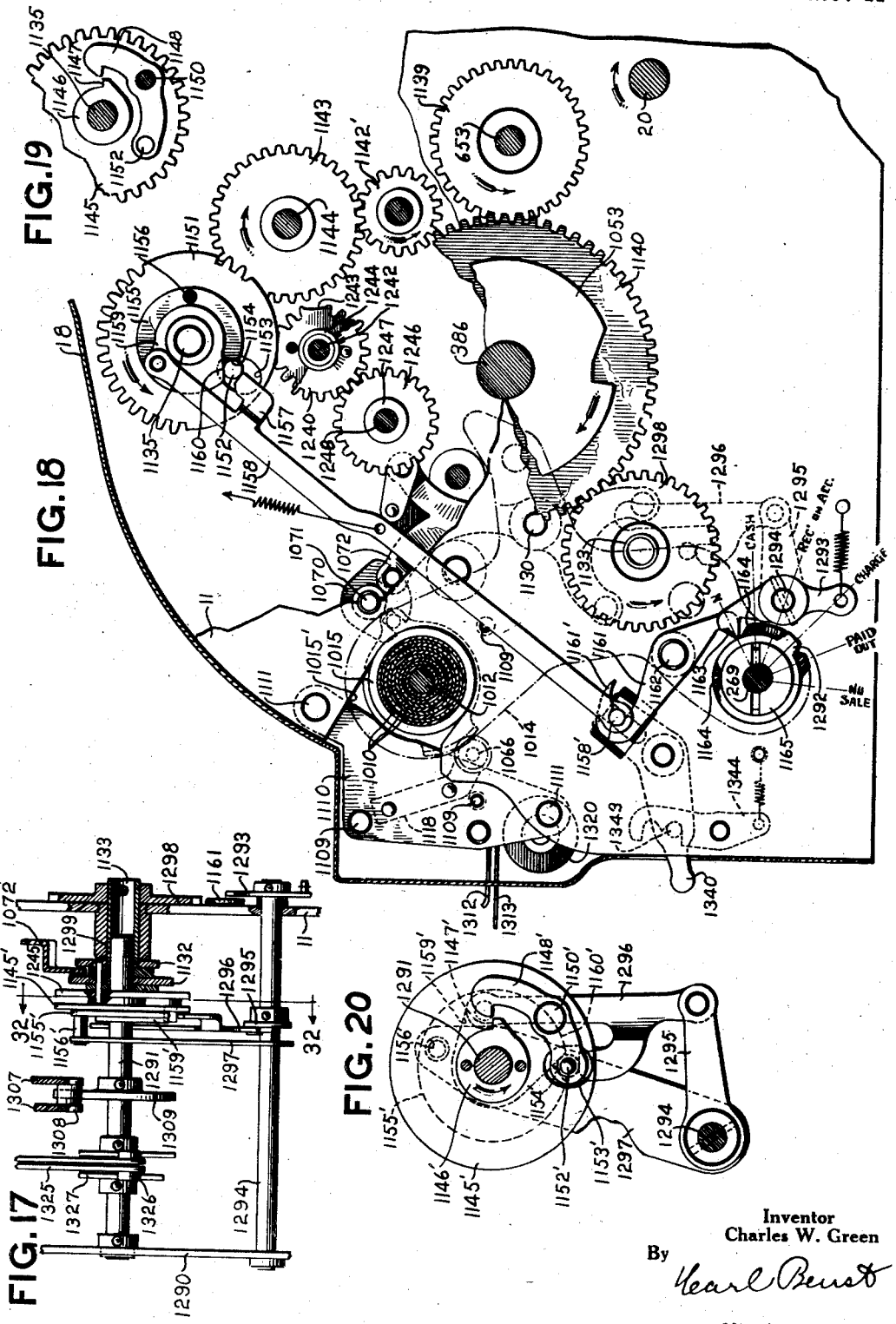
Inventor
Charles W. Green
By Karl Benst
His Attorney

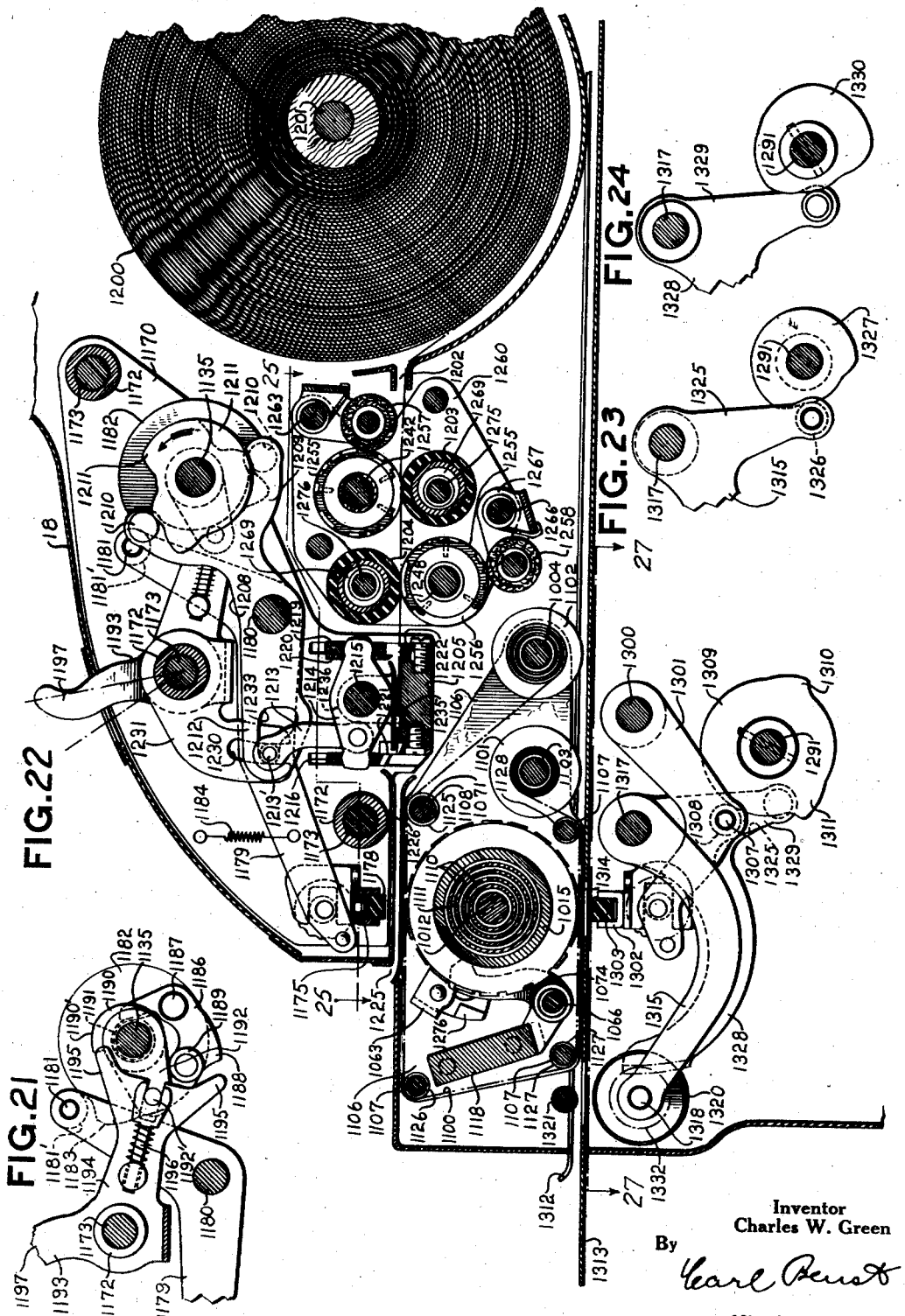

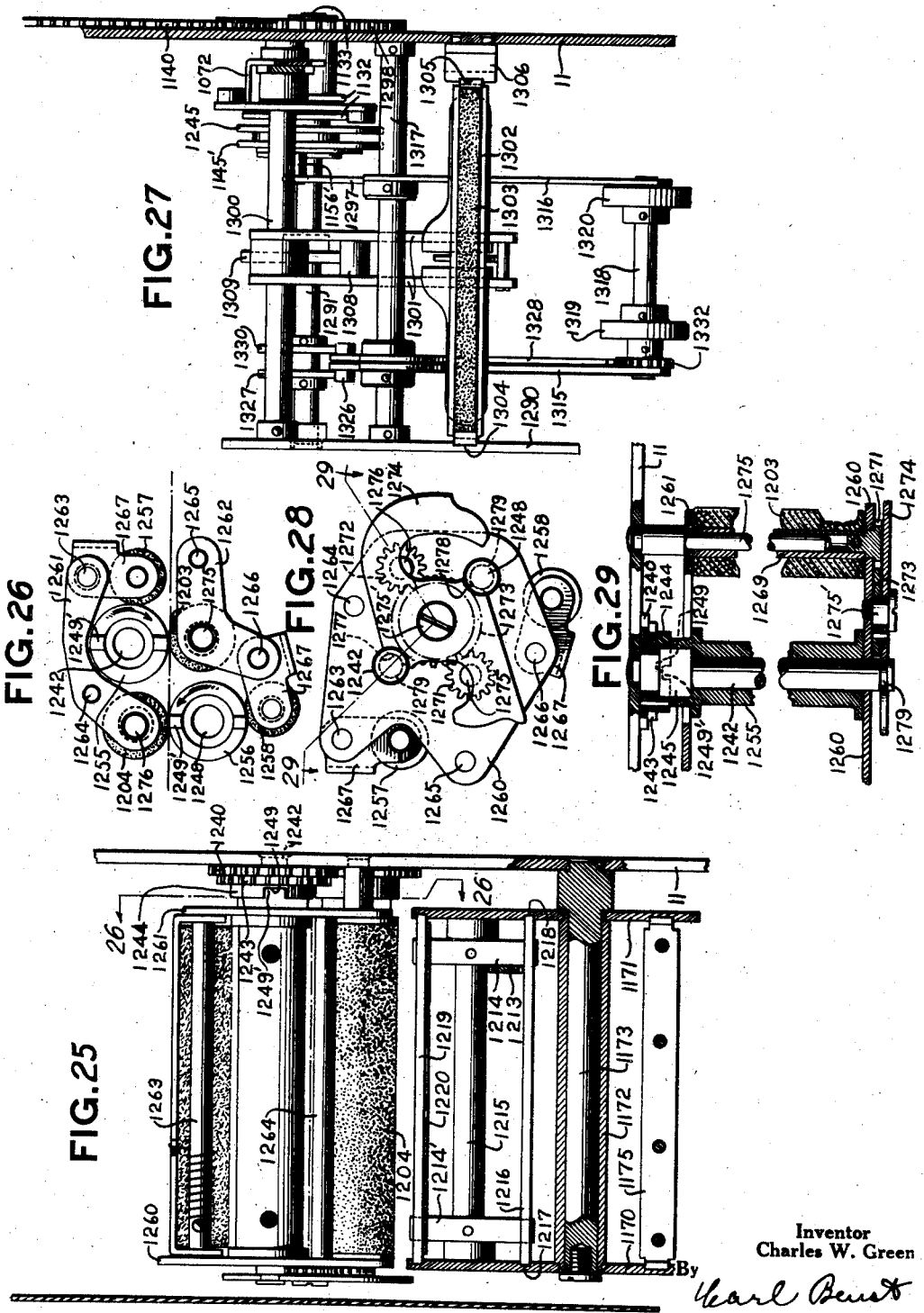

Jan. 16, 1940.   C. W. GREEN   2,187,200
CASH REGISTER
Original Filed March 27, 1931   15 Sheets-Sheet 14
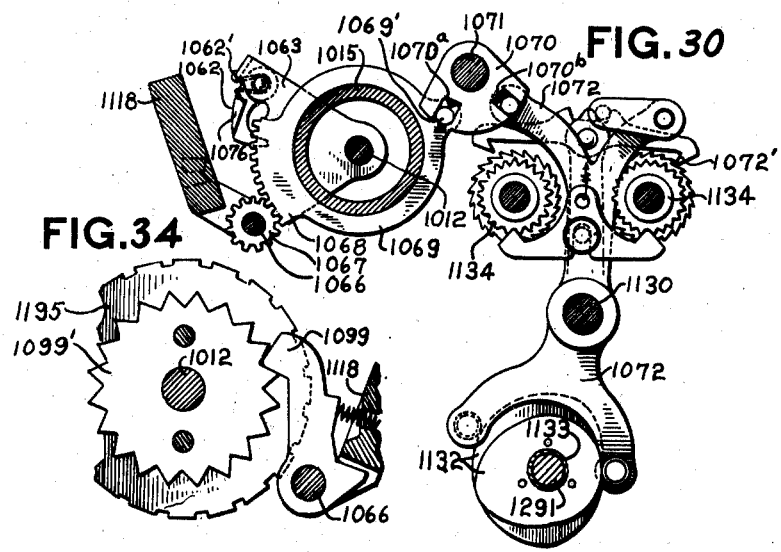
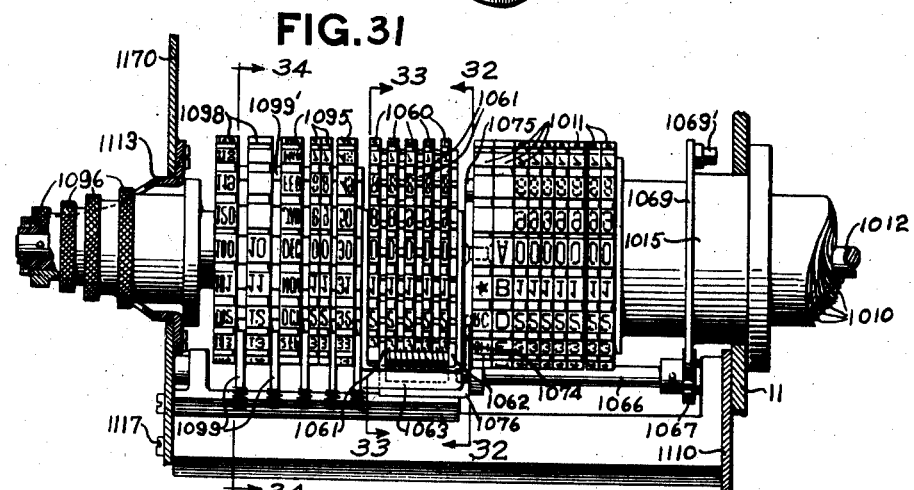
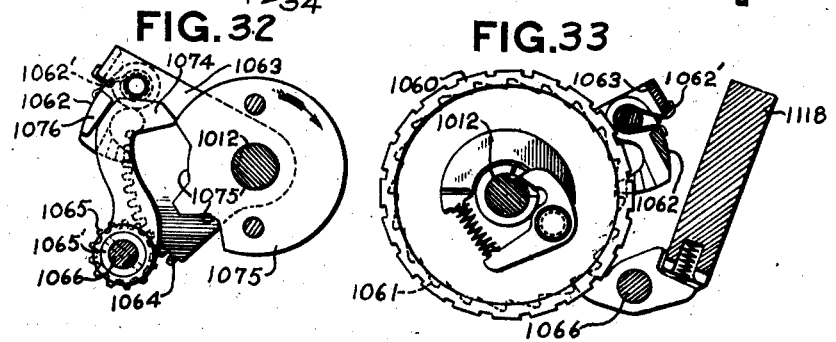
Inventor
Charles W. Green
By
*Kearl Beust*
His Attorney

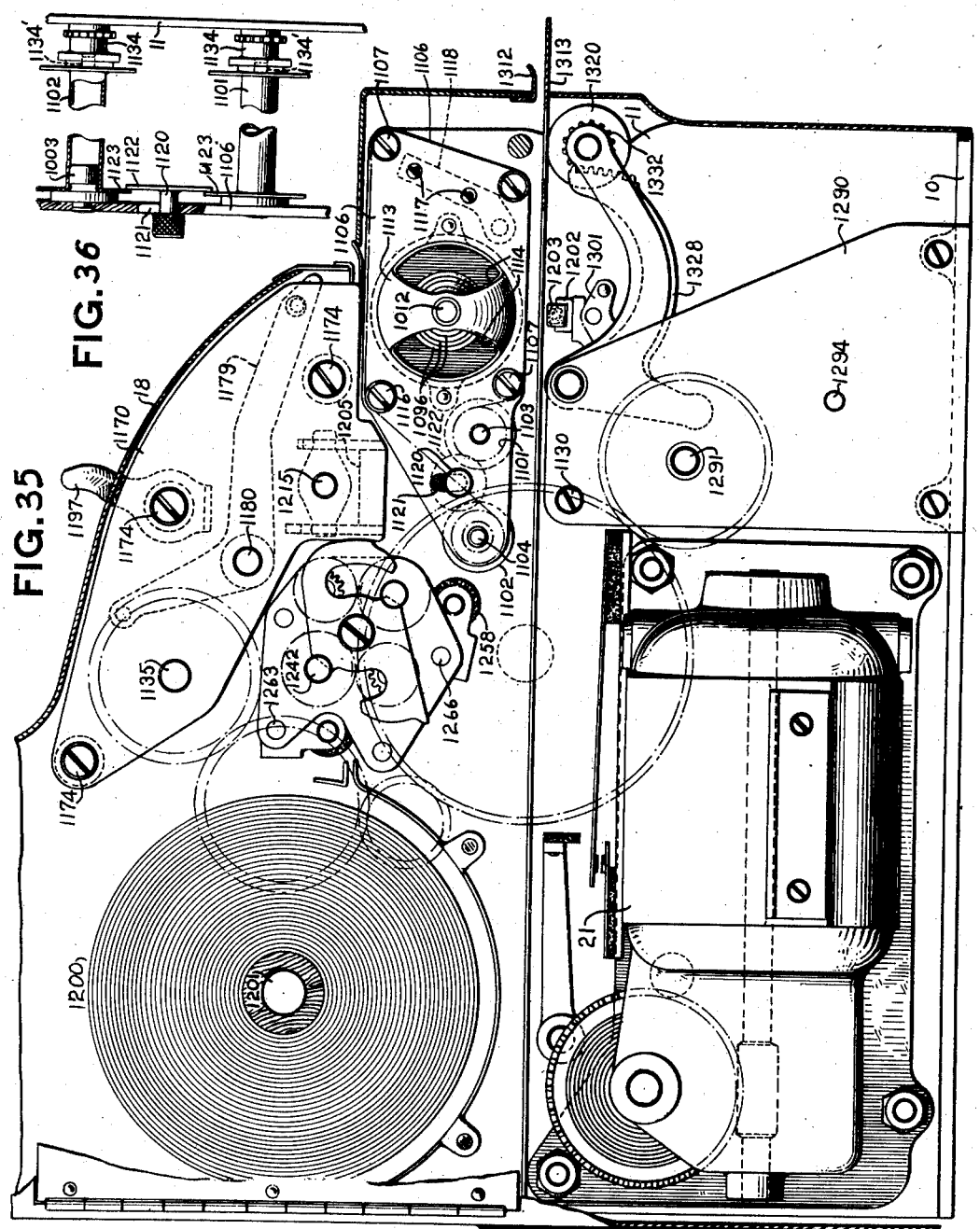

Patented Jan. 16, 1940

2,187,200

UNITED STATES PATENT OFFICE 2,187,200

CASH REGISTER

Charles W. Green, Dayton, Ohio, assignor to The National Cash Register Company, Dayton, Ohio, a corporation of Maryland Original application March 27, 1931, Serial No. 525,630. Divided and this application April 9, 1936, Serial No. 73,449

9 Claims. (Cl. 101—96)

This invention relates to cash registers and analogous devices and particularly to that type having a plurality of totalizers some of which are provided for separately registering the totals of the various transactions entered in the machine by the individual clerks while others are provided for separately registering the totals of the different kinds of transactions entered in the machine. This invention also relates to the type of machines capable of printing upon a detail strip a record of each transaction entered in the machine, and also to the type which issues checks or receipts and prints upon inserted slips so that a customer may also have a record of his purchases, and is a division of the application for United States Letters Patent of Charles W. Green, Serial No. 525,630, filed March 27, 1931, now Patent No. 2,063,091, issued December 8, 1936.

Another important object of the present invention is to provide mechanisms which are controlled by the various keys for automatically printing upon issued checks or sales slips, data corresponding to the keys depressed.

Further objects of the present invention are to effect improvements in check and slip printing and issuing mechanisms and controls therefor.

With these and incidental objects in view, the invention includes certain novel features of construction and combinations of parts, the essential elements of which are set forth in the appended claims, and a preferred form or embodiment of which is hereinafter described with reference to the drawings which accompany and form part of this specification.

Of said drawings—

Fig. 12 is a fragmentary view showing the arrangement of the nested sleeves associated with the check and slip type wheels, and also certain connections associated with the means for resetting the consecutive number counter for the check and slip printing mechanisms.

Fig. 13 is a sectional view on line 13—13 of Fig. 3.

Fig. 14 is a sectional plan view taken on line 14—14 of Fig. 15 showing in detail the locking pawl for retaining the type carriers in adjusted position.

Fig. 15 shows principally the train of gears for operating the check and slip printing mechanisms and also illustrates in detail the means for adjusting the clerks' type carrier associated with these mechanisms.

Fig. 16 is a sectional plan view with parts broken away showing the check printing mechanism.

Fig. 17 is a view partly in elevation and partly in section showing the clutch associated with the slip printing mechanism.

Fig. 18 is a fragmentary view taken adjacent the left-hand side frame of the machine showing the operating connections for the check and slip printing mechanisms.

Fig. 19 is a detail view of a portion of the clutch for imparting movement to the check mechanism.

Fig. 20 is a detail view of the clutch shown in Fig. 17.

Fig. 21 is a detail view of the mechanism for controlling the number of printing impressions to be made upon issued checks.

Fig. 22 is a view taken on line 22—22 of Fig. 16 looking in the direction of the arrows.

Fig. 23 is a detail view showing the cam for moving the pressure roll into engagement with the inserted slip.

Fig 24 is a detail view of the cam for actuating the pressure roll to feed the inserted slip.

Fig. 25 is a view taken on line 25—25 of Fig. 22.

Fig. 26 is an end view taken on line 26—26 of Fig. 25 showing in detail the construction of the feeding rollers associated with the check printing mechanism.

Fig. 27 is a general plan view of the slip printing mechanism taken on line 27—27 of Fig. 22.

Fig. 28 is an elevational view of the assembly which contains the feeding rollers shown in Fig. 26.

Fig. 29 is a sectional view taken on line 29—29 of Fig. 28.

Fig. 30 is a fragmentary view showing the mechanism for operating the consecutive numbering device associated with both the check and slip printing mechanisms. This view also illustrates the ribbon feeding and reversing device related to these mechanisms.

Fig. 31 is a plan view of the type carrying elements associated with the check and slip printing mechanism.

Fig. 32 is a sectional view taken on line 32—32 of Fig. 31. This view shows the means for automatically preventing the actuation of the consecutive numbering device upon certain operations.

Fig. 33 is a sectional view taken on line 33—33 of Fig. 31.

Fig. 34 is a sectional view taken on line 34—34 of Fig. 31.

Fig. 35 is a complete left-end view of the machine taken inside of the cabinet, particularly showing the arrangement and location of the check and slip printing mechanisms.

Fig. 36 is a fragmentary view showing the construction of the support for the inking ribbon spools.

General description

Described in general terms this divisional application relates particularly to check and slip printing and the controls for the several printing mechanisms, such controls being governed by keys on the keyboard and by other special manipulative devices as will be later described in detail.

Near the left-hand end of the machine is mounted the check and slip printing mechanism.

The check issuing mechanism provided in the illustrated machine is of such a nature that either "straight" checks or "stub" checks may be issued from the machine. This mechanism is provided with manually controlled means for predetermining which kind of check is to be issued. Suitable electro rolls are provided for printing any desired advertisements upon the issued checks as they are fed from the supply roll. When "straight" checks are to be issued, the platen associated with the check printing mechanism is rocked into engagement with the upper set of type characters provided on a series of type wheels but once during an operation of the machine. When "stub" checks are issued, the platen is operated twice to effect duplicate printing upon the issued check. A perforating mechanism is also provided for perforating the checks between the printing impressions effected thereon. A severing mechanism is also provided which severs the check after the printing and perforating operations have been effected thereon. Adjacent the item type carriers, associated with the check and slip printing mechanisms is a printing consecutive counter. This counter is operated each time another consecutive counter is operated so that it will correspond at all times therewith. Adjacent the counter wheels are a series of date printing wheels and adjacent the date printing wheels are two special type carriers which print respectively, the number of the machine and also the number of the store in which the machine is installed. All of these type wheels are provided with duplicate sets of type, the upper set of which is provided for printing upon issued checks, while the lower set thereof is provided for printing upon inserted sales slips. A platen cooperates with the lower set of type wheels for effecting printing upon inserted sales slips. This platen is operated twice during an operation of the machine to effect duplicate printing upon the inserted sales slips. Both the mechanism for printing upon inserted slips and that for printing upon issued checks are normally disconnected from the main operating mechanism. The check issuing mechanism is automatically rendered operative for cash and received on account and paid out transactions, while the slip printing mechanism is rendered effective for received on account and charge transactions. For all other transactions these mechanisms remain ineffective. A manual means is also provided to disable the check issuing mechanism for all operations of the machine when it is desired to operate that machine without this feature.

Frame work

Figure 1:
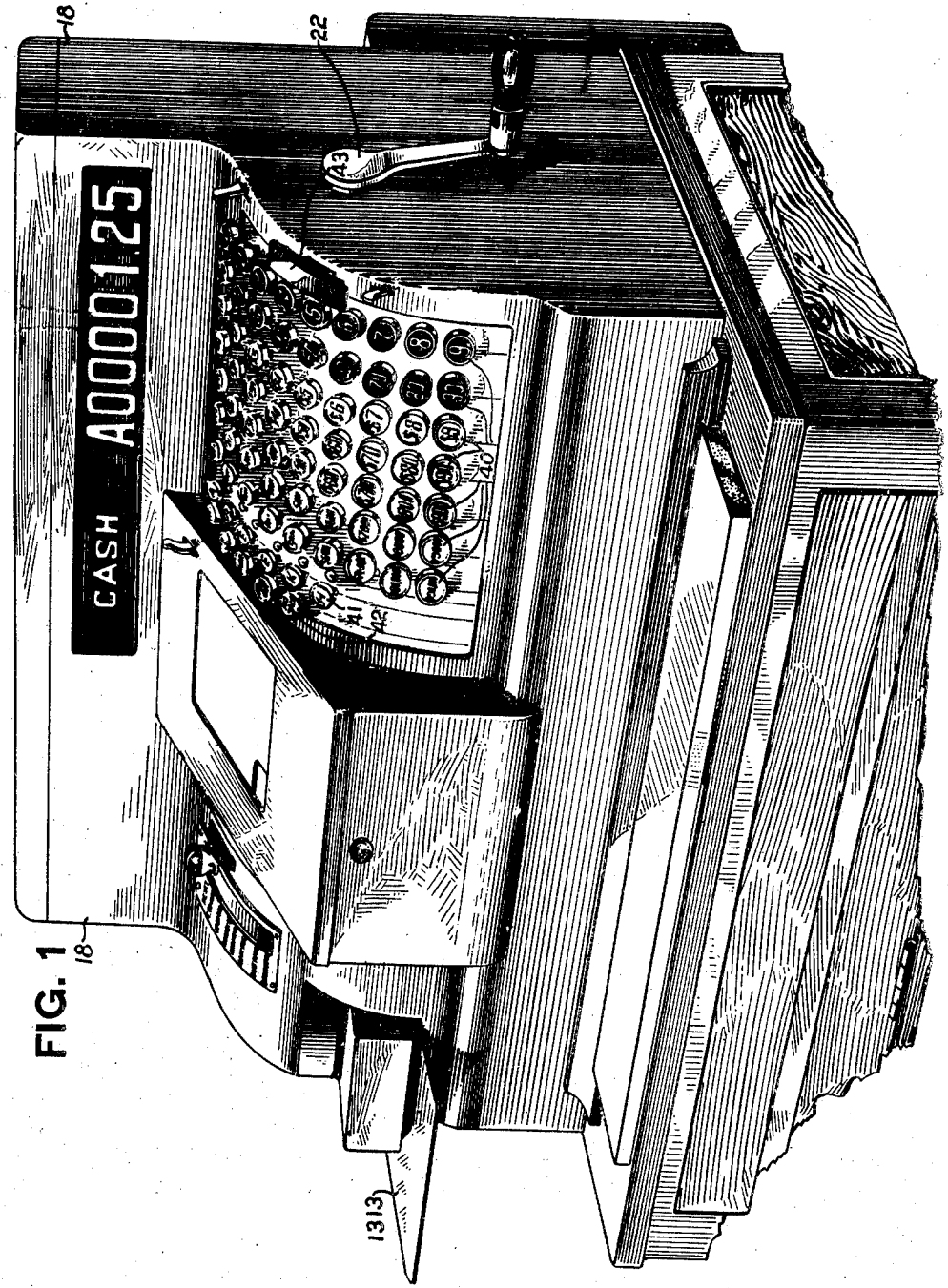
Fig. 1 is a perspective view of the complete machine embodying this invention.

The various parts of the machine are supported by a suitable frame work comprising a base casting 10 (Fig. 2), two main side supporting frames 11 and 12 and two intermediate supporting frames 13 and 14. These frames are fastened to brackets 15 attached to the base casting, by screws, rivets or any other suitable means. A plate 16 (Fig. 3) extending across the back of the machine is fastened to brackets 17 provided along the rear edge of each of the frames. This plate acts as a brace for all of the frames. The mechanisms contained in this machine are enclosed by a cabinet 18. A hinged door is provided at the left-hand side of the cabinet for rendering the mechanisms associated with the check and slip printer accessible for replenishing the check paper supply and also permitting adjustment of the parts without requiring the removal of the cabinet from the machine. The cabinet is also provided with suitable openings for receiving key sections and several of the control mechanisms as is clearly shown in Fig. 1.

Operating mechanism

Figure 3:
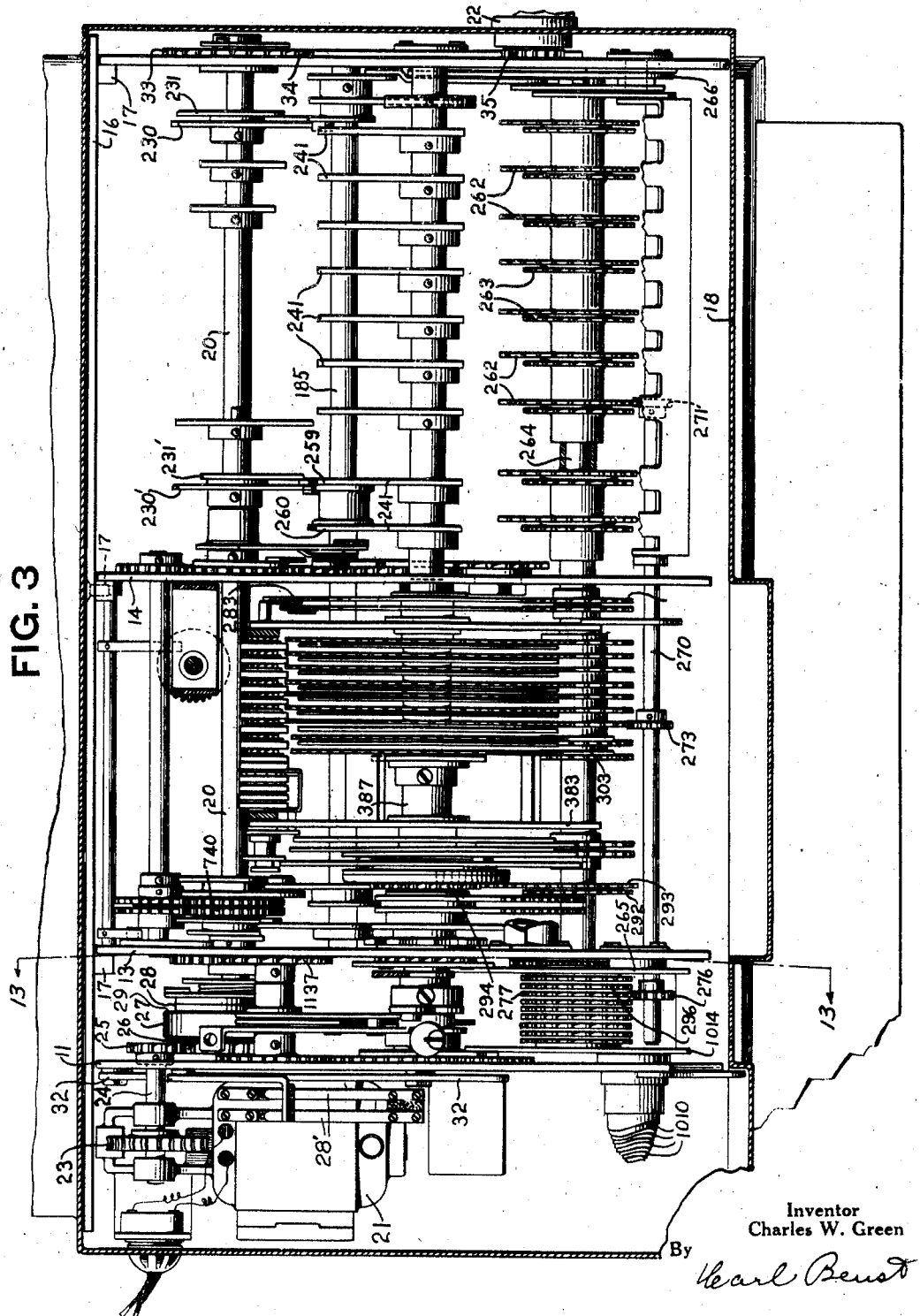
Fig. 3 is a plan view of the mechanisms located substantially below the mid-portion of the machine.
Figure 4:
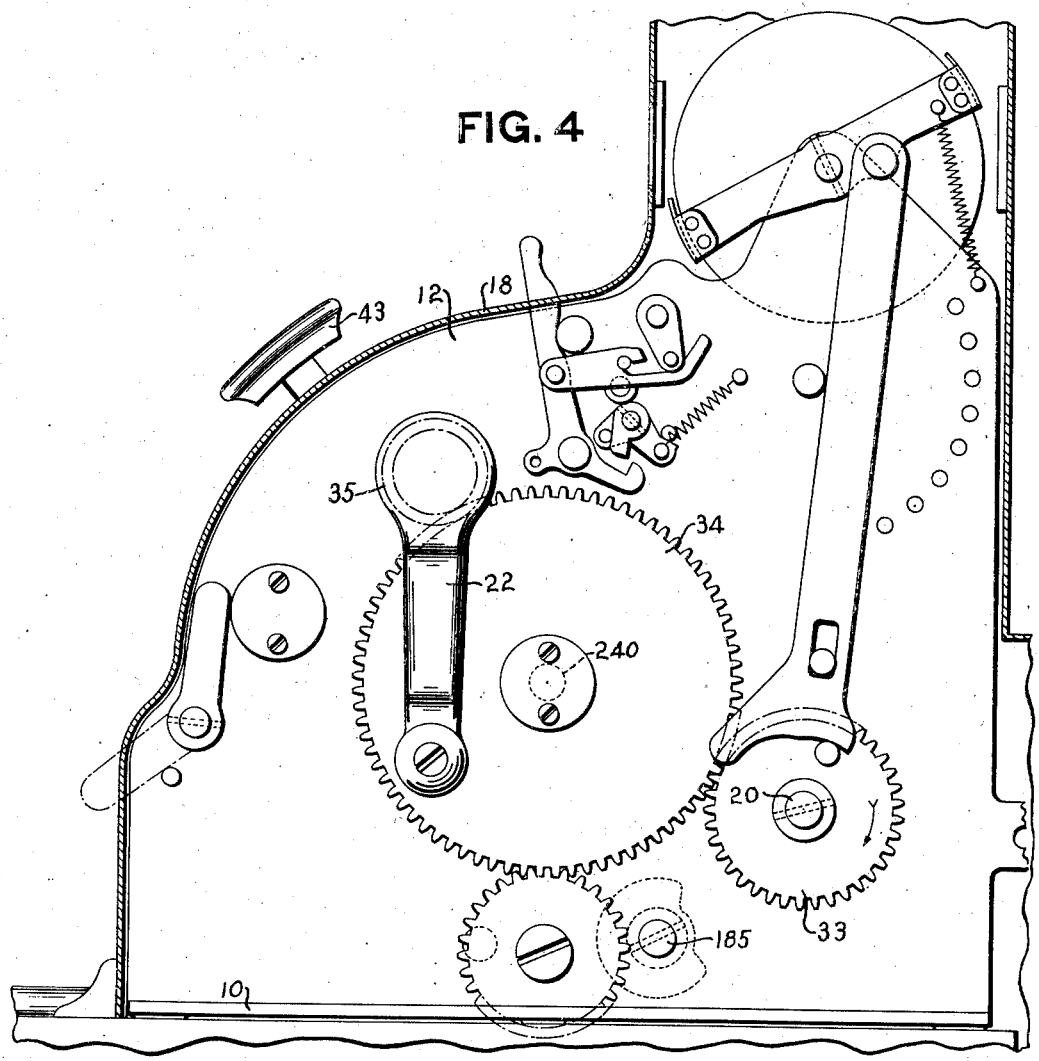
Fig. 4 is a right-end view of the machine with the end portion of the cabinet removed.

The power is imparted to various mechanisms of the machine by a main driving shaft 20 (Fig. 3), which is driven either by an electric motor 21 or a hand operated crank 22 (Fig. 4). Shaft 20 is given one complete rotation at each operation of the machine. As shown in Fig. 3 the usual reduction gearing, designated generally by reference character 23, is provided between the electric motor 21 and a short shaft 24. Shaft 24 extends through an enlarged opening in side frame 11 and carries a pinion 25 at the inner end thereof which meshes with a gear 26 attached to a flanged disc 27 of clutch 28. A cooperating clutch member is fixed to the left-hand end of the main operating shaft 20 and operates within the flanged portion of disc 27 to cause the clutch members to drive shaft 20 when the motor is operated. The control mechanism for the motor switch 28' is also shown generally in Fig. 3. The clutch and the switch control mechanism associated with the electric motor 21 are of a well known type such as shown in the United States patent to Charles F. Kettering and William A. Chryst No. 1,144,418 issued June 29, 1915 and will not be described in detail herein.

The electric motor 21 is mounted on a support 32 which is attached to side frame 11 by screws or bolts. This not only facilitates assembling of the parts but renders the motor assembly readily detachable from the machine.

Referring to Figs. 3 and 4 it will be seen that a pinion 33 is fixed to the right-hand end of shaft 20. This pinion meshes with a large idler gear 34 which gear in turn meshes with a smaller gear 35 which is driven by hand crank 22. Thus it is seen that mechanism is provided for driving shaft 20 either manually by crank 22 or automatically by electric motor 21. A suitable clutch mechanism is provided between hand crank 22 and pinion 35 which permits movement of gears 33, 34 and 35 without moving crank 22 when the machine is operated by the electric motor 21. Suitable mechanism is also provided to permit removal of crank 22.

*Keyboard*

The keyboard of the machine is comprised of seven banks of amount keys 40 (Figs. 1, 2 and 10), one bank of clerks' keys 41, and one bank of transaction keys 42. The clerks' and transaction keys and amount keys are shown only in section in Fig. 2. A motor bar 43 (Figs. 1, 2 and 4) is provided for effecting release of the machine. The keys of each bank are supported in frames 44 mounted in the usual manner on cross rods 46 and 47.

For the purposes of this case it will be sufficient to state that each bank of amount keys controls a differential mechanism and a zero stop pawl 72 (Figs. 9 and 10) through the medium of detents which are fully illustrated and described in the parent case, above mentioned. The banks of clerks' and transaction keys control differential mechanisms.

*Differential mechanism*

Figure 9:
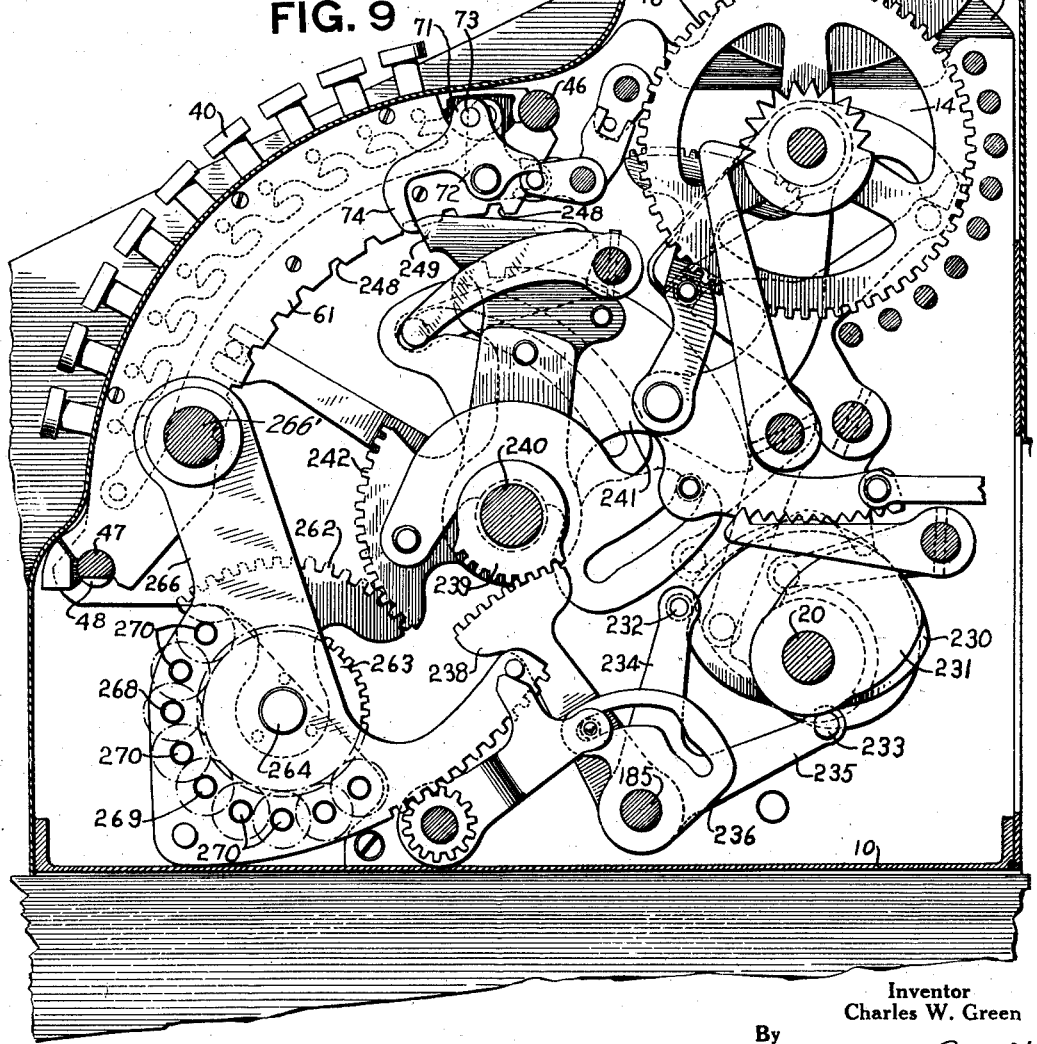
Fig. 9 is an elevational view taken on line 9—9 of Fig. 2.
Figure 10:
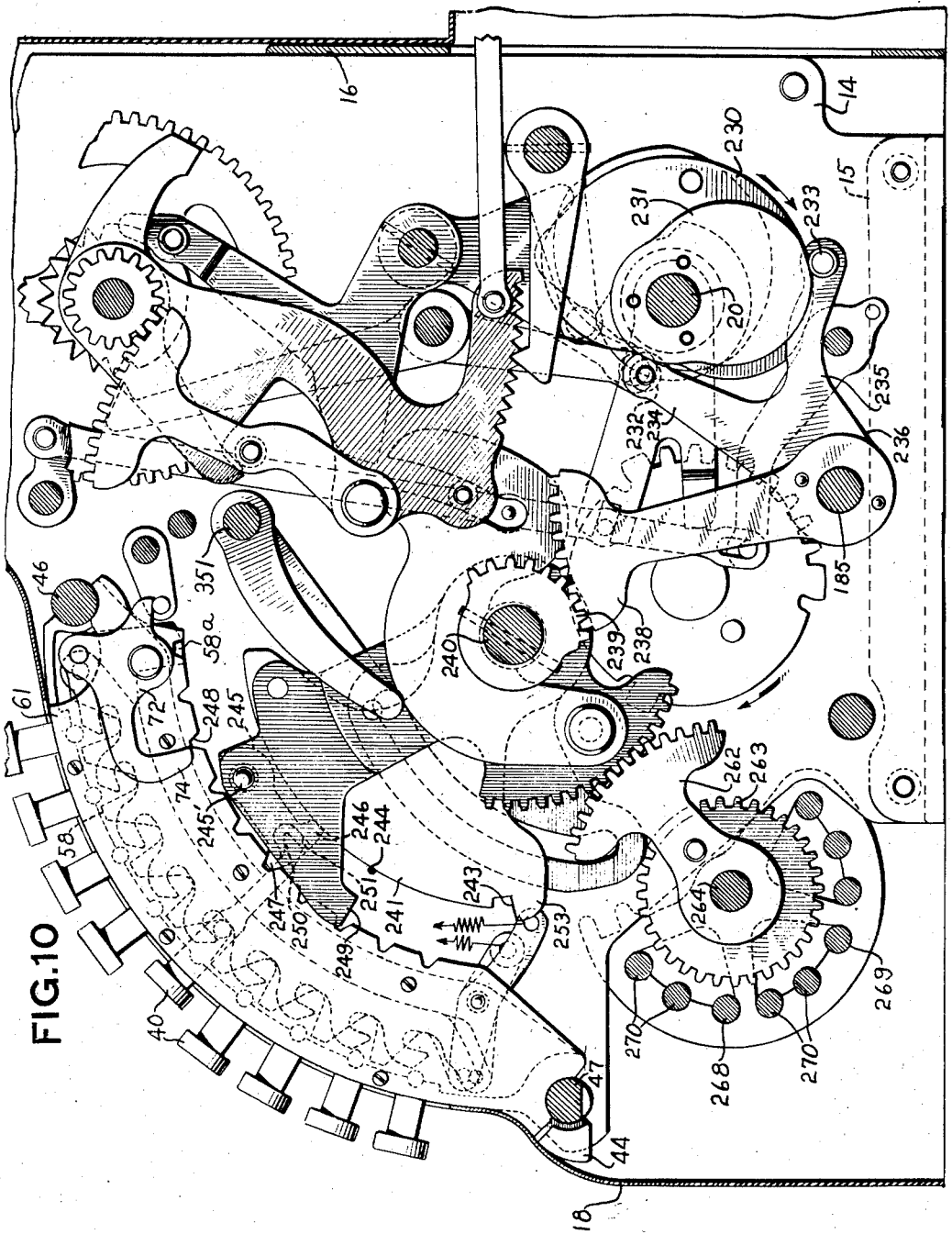
Fig. 10 is an elevational view illustrating the relative positions of the parts comprised in the differential and indicator mechanisms when the main driving shaft has been moved substantially 100° and when a key in an amount section has been depressed.
Figure 11:
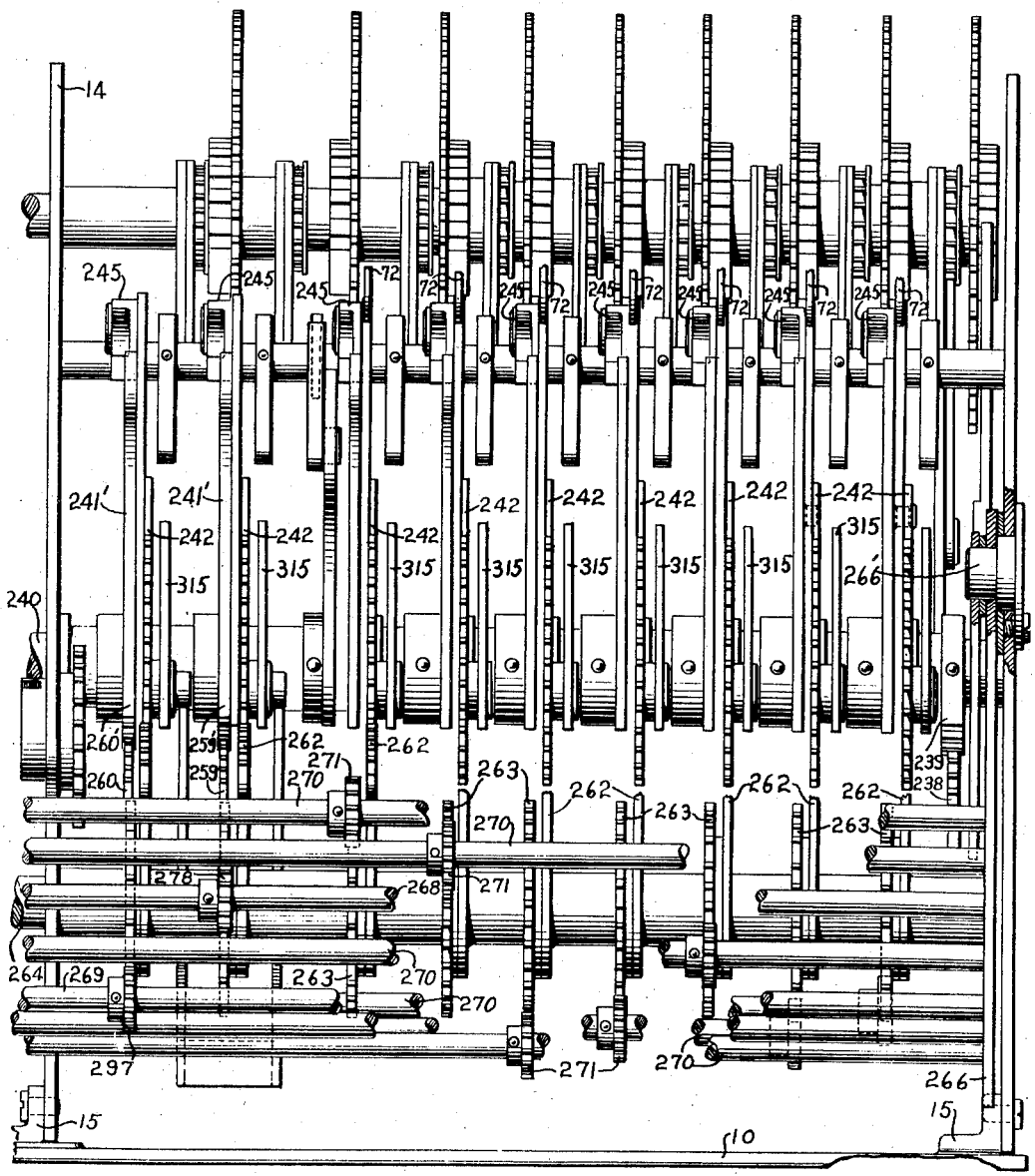
Fig. 11 is a partial front elevational view showing the differential mechanism and the associated transmission line.

The present machine is provided with a positively operated differential mechanism for controlling and setting the various type carriers associated with the record strips and check strip mechanisms. As shown in Figs. 9, 10 and 11, a cam 230 and its companion cam 231 are secured to the drive shaft 20 and cooperate with rollers 232 and 233 on arms 234 and 235 respectively of a lever 236 pivoted on a shaft 185. Integral with the lever 236 is a segmental gear 238 meshing with a gear segment 239 secured to a shaft 240. Also secured to the shaft 240 is a series of driving segments 241, one for each bank of amount keys.

Since the structure and operation of the driving segments and of the differential mechanism associated therewith are the same for all of the amount banks of keys, a brief description of the structure and operation of one will suffice for all, and, for the purposes of illustration, the units bank differential mechanism will be used.

Pivoted on the shaft 240 is a differential segment 242 carrying a pawl 245 pivoted at 245'. This pawl has a projection 246 which normally engages a notch 243 of its associated driving segment 241. A projection 247 of the pawl is adapted to engage in any one of a series of notches 248 in its corresponding differential latch retaining plate 61.

In Fig. 9, the parts are shown in their normal positions, wherein a nose 249 of the differential segment engages an arm 74 of the zero stop pawl 72. Therefore, if no key in that bank is depressed upon operation of the driving shaft 20, the cam 230 rocks the lever 236 clockwise, whereupon the segmental gear 238 and segment 239 rock the shaft 240 and the driving segment 241 counterclockwise. In this case, however, the differential segment 242 will be held against movement by its contact with an arm 74 of the zero stop pawl 72, with the result that the pawl 245 will be disengaged from its driving segment 241, and the projection 247 of the pawl will enter the first notch 248 in the plate 61. The segments 241 will continue their downward movement until they reach their limit of travel, after which the cams 230 and 231 will return them to their normal positions, whereupon the notch 243 will again register with the projection 246 of the pawl 245 and will drop into the notch by gravity.

When a key 40 of an amount bank is depressed, the arm 74 of the zero stop pawl will be swung away from the nose 249 of the differential segment 242, and the associated segment 241 will carry the differential segment downwardly until stopped by the particular key depressed.

When a key is depressed, the foot 58a (Fig. 10) on a cam plate 58 associated therewith will close the first notch 248, which normally is adapted to receive the projection 247 of the pawl 245 when the machine is operated with no key depressed in that bank. The lower end of each key has a cam face 250 and the forward end of the latch pawl 245 has a notch 251. Therefore, when the differential segment 242 is moved downwardly by its driving segment 241, the notch 251 engages the end of the depressed key, thus camming the pawl 245 clockwise, causing its projection 247 to enter the notch 248 adjacent the depressed key. In this manner the differential segment 242 is disengaged from the driving segment 241 and is held in adjusted position by the engagement of the projection 246 of the latch pawl 245 with the concentric surface 244 of the driving segment 241.

During the same operation of the machine, each driving segment is returned to normal position, thus causing a projection 253 thereon to engage the projection 246 of its associated pawl 245. By this action, the projection 246 of the pawl 245 will reenter the notch 243 of its driving segment 241, and, consequently, the associated differential segment 242 will be returned to home position.

From the above description it can be clearly seen that during an item entering operation the differential segments 242 will first, be positively adjusted by their segments 241 a distance determined by the respective keys depressed, and then positively restored to their normal positions.

Fig. 10 shows the parts associated with the units or penny bank of keys in operated position when the five-cent key has been depressed. The nose 249 of each differential segment 242 swings between a related retaining plate 61 and the key spring retaining plate of the next adjacent key section. Thus, the differential segments are prevented from moving laterally.

The differential mechanisms associated with the clerks' and transaction banks of keys are substantially the same as those associated with the amount banks, except that the driving segments for the clerks' and transaction differential segments are not restored to normal positions simultaneously with the restoration of the driving segments for the amount differential segments. The clerks' and transaction banks of keys are not provided with zero stop pawls, since the differential segments for those banks will be operated for each operation of the machine, as it requires the depression of a transaction key and a clerks' key, in combination with the motor bar, to release the machine for operation.

Figure 8:
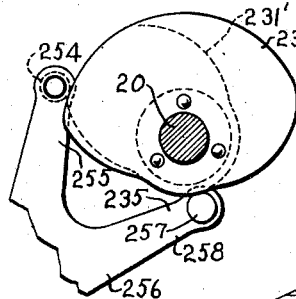
Fig. 8 is a detail view of the cams for operating the driving members associated with the clerks and transaction differential segments.

As shown in Fig. 11, there is a pair of driving segments 241' loose on the shaft 240 to actuate the clerks' and transaction differential segments 242. A cam 230' (see also Fig. 8) and its companion cam 231' secured to the shaft 20, through the rollers 254 and 257 on the arms 255 and 258 of a lever 256 pivoted on the shaft 185, and the actuating segments 259 and 260 meshing with the gear segments 259' and 260', actuate the driving segments 241' upon rotation of the main shaft 20 to drive the clerks' and transaction differential segments 242. As mentioned above, the driving segments 241' remain in their operated positions while the driving segments 241 for the amount differentials are restored to their normal positions. During a latter period in the operation of the machine, the driving segments 241' are restored to their normal positions and likewise restore their respective differential segments 242 to normal positions.

*Transmission mechanism*

Figure 2:
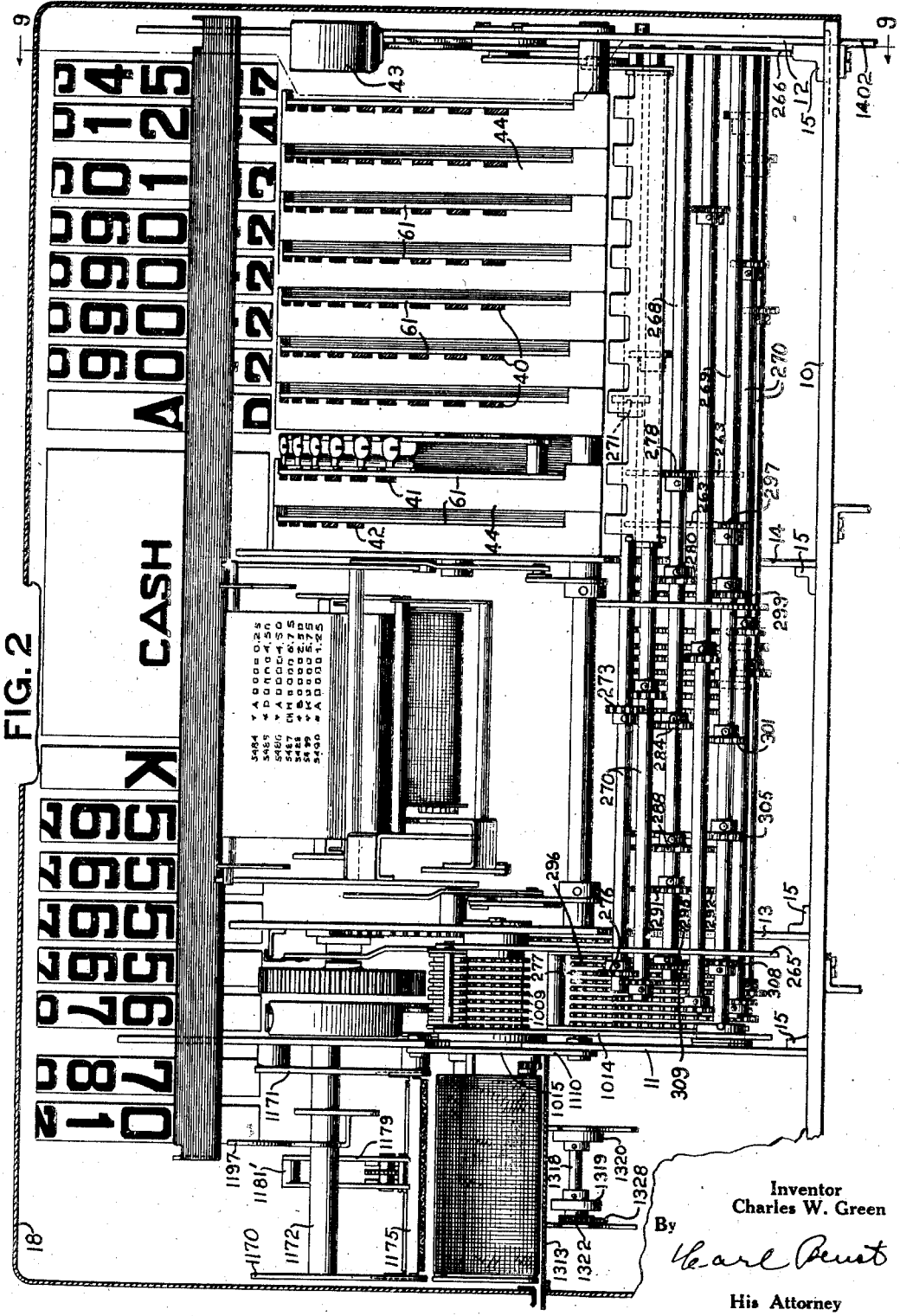
Fig. 2 is a front elevational view with the front portion of the cabinet removed, showing the general arrangement and location of various of the mechanisms contained in the machine.

Referring to Fig. 9, it will be seen that each differential segment 242 meshes with a segmental gear 262 which is fixed to a corresponding gear 263 loosely pivoted on a shaft 264 journaled in the frames 265, 266 and 1014 (Fig. 2). The transmission mechanism comprises nine shafts journaled in frames 265 and 266 which are mounted in an arc about gears 263 (see also Fig. 13). Frames 265 and 1014 (Fig. 2) are pivoted around shaft 1012 (Fig. 13), while frame 266 is pivoted on a stud 266' (Fig. 11) fixed to supporting frame 12 (Fig. 2) and in axial alignment with shaft 1012. As shown in Fig. 2 it is seen that shaft 268 is provided to transmit motion from the differential segment associated with the clerks' bank of keys while shaft 269 is provided to transmit motion from the transaction differential segment. The shafts 270 of the transmission mechanism transmit motion from their respective amount differential segments 242 to the various mechanisms which will be fully described hereinafter.

Referring to Figs. 2, 3 and 11, it will be seen that the top shaft 270 is that associated with the tens of thousands bank of amount keys. Pinned to this shaft is a pinion 271 (Fig. 11) which meshes with a gear 263 loosely mounted on shaft 264, which gear in turn, has a segment 262 fixed thereto which meshes with the differential segment 242 for the tens of thousands bank of keys. Spaced from pinion 271 is a second pinion 273 which is also pinned to shaft 270. This pinion operates mechanism which forms no part of the instant invention.

Spaced from pinion 273 is a third pinion 276; also pinned to shaft 270, meshing with gear 277 loosely pivoted on a sleeve 1016 (Figs. 13 and 15) provided on shaft 264. Gear 277 meshes with a gear segment 1000 for positioning the type carriers for that denominational order in the check and slip printer.

Each shaft 270 associated with an amount differential segment 242 is provided with a similar set of pinions for actuating corresponding gears in both the totalizer reel and check and slip printing mechanism.

The shaft 268 (Fig. 2) associated with the clerks' differential segment 242 is provided with six small pinions fixed thereto. The first pinion 278 meshes with a gear 263 (Fig. 3) loosely mounted on shaft 264. Gear 263 has fixed thereto a segmental gear 262 which meshes with the differential segment 242 for the clerks' bank of keys. Spaced from pinion 278 on shaft 268 are pinions 280, 284, 288, and 291 which operate mechanism which forms no part of the instant invention and will not be described herein. This mechanism is fully described in the parent case. Spaced from pinion 291 (Fig. 2) is a sixth pinion 295 which meshes with a corresponding gear 296 loosely pivoted on sleeve 1016 (Fig. 15) on shaft 264, which gear in turn meshes with a gear segment 1000 for positioning the clerks' type carrier associated with the check and slip printing mechanism.

From the description of the above mechanism, it is clear that when gear 263 (Figs. 2 and 3) is adjusted by the clerks' differential segment 242, shaft 268 will be rotated which in turn will cause the six pinions fixed thereto to rotate and transmit the motion from the differential segment 242 to all of the mechanisms just described.

The shaft 269 associated with the transaction differential segment 242 has five pinions fixed thereto. The first pinion 297 meshes with a corresponding gear 263 loosely pivoted on shaft 264 which gear has fixed thereto a gear segment 262 which meshes with differential segment 242 for the transaction bank of keys. Spaced from pinion 297 are pinions 299, 301, and 305 which operate mechanisms which form no part of the instant invention and will not be described further herein. Spaced from pinion 305 is a fifth pinion 308 which meshes with a corresponding gear 309 pivoted on sleeve 1016 (Fig. 15) on shaft 264, which gear in turn engages a gear segment 1000 for adjusting a type carrier bearing the transaction characters and associated with the check and slip printer. Thus, it is seen that when an amount key, a transaction key, and a clerks' key are depressed and the machine operated, the movement of the differential segments associated therewith will be positively transmitted to the various mechanisms of the machine through the transmission line just described.

*Check and slip printer*

The check and slip printer provided in the illustrated machine is located at the extreme left-hand side thereof. This device is capable of effecting printing upon issued checks or inserted slips from a single set of type wheels. Each type wheel is provided with two similar sets of type characters, the similar characters being arranged at diametrically opposite points on the periphery of the type wheels. The upper set of type characters is adapted to cooperate with a platen to effect printing upon issued checks, while the lower set of type characters cooperates with a second platen to effect printing upon inserted sales slips. The mechanism for actuating the platen for printing upon issued checks may be regulated to control the number of impressions to be made thereon. For example, when it is desired to issue "straight" checks, this mechanism is so adjusted that the platen will effect but one printing impression upon the checks, whereas when it is desired to issue "stub" checks, it is so adjusted as to cause two operations of the platen and thereby effect duplicate printing upon the issued checks. The mechanism for printing upon and issuing checks is normally inoperative but is rendered operative when certain transactions are entered in the machine as will be described hereinafter.

The platen for printing upon inserted sales slips is also normally inoperative but when it is rendered operative it is actuated twice during an operation of the machine to effect duplicate printing upon the inserted sales slip.

In the illustrated machine, for cash, received on account, and paid out transactions, the check issuing mechanism is automatically conditioned for operation, but for charge and no sale transactions, it remains disabled so that no check will be issued. The slip printing mechanism is also automatically conditioned for operation for charge transactions but remains disabled for operation when cash, paid out, received on account, and no sale transactions are entered in the machine. It is to be understood, however, that by slightly modifying the present structure, the check and slip printing mechanisms may be conditioned to print upon and issue checks and print upon inserted slips for any desired series of transactions. Manual means is also provided for disabling the check mechanism when it is desired to operate the machine without the use thereof.

The item type wheels and the type wheels provided with clerks' and transaction characters, respectively, are moved directly from one position to another without first returning them to a zero or starting position. The mechanism for performing this function will first be described. Referring to Figs. 2 and 9, it will be seen that shafts 268, 269, and 270 have fixed to their extreme left-hand ends pinions 295, 308 and 276, respectively, which pinions mesh with their related large gears 296, 309 and 277, loosely mounted on shaft 1016. These gears are adapted to adjust their related type carriers 1011 (Fig. 31) through the following mechanism. Since the structure and operation of each series of connections is the same for each of the type carriers 1011, a description of the structure and operation of one will suffice for all. For the purpose of illustration, a description of the mechanism associated with the clerks' type carrier will be given. As seen in Fig. 15, gear 296 meshes with a segmental gear 1000, which gear is pivoted on a rod 1001 supported in transmission line supporting frames 265 and 1014 (Figs. 13 and 15). Pivoted to segmental gear 1000 (Fig. 15) at 1002 is a beam 1003. The upper end of beam 1003 is provided with an open slot 1004 into which projects a stud 1005 provided on a second segmental gear 1006 also pivoted on rod 1001. It will be seen that beam 1003 is provided with a bearing surface 1007 intermediate its ends which is concentric with rod 1001. This surface coacts with a raised surface on segment 1000 which is also concentric with rod 1001. Segmental gear 1006 meshes with a gear 1009 attached to one end of a long sleeve 1010 (Figs. 12 and 31), which sleeve has fixed to its other end a connection for adjusting its related type carrier 1011 from one position to another. There are a series of similar connections provided for each type carrier 1011. Sleeves 1010 are nested in the usual manner to permit relative movement of the type carriers 1011. The supporting means for the parts just described (except the sleeves 1010 and type wheels 1011) comprises the supporting frames 265 and 1014 (Figs. 13 and 15) of the transmission line. Frame 1014 is pivoted upon a large bushing 1015 (Figs. 2 and 14) extending into an inclined notch 1015' (Fig. 18) provided in side frame 11 of the machine. The left-hand end (as viewed from the front of the machine) of the shaft 264 (Fig. 15) of the transmission line is journalled in a sleeve 1016 pressed within an aperture provided near the lower end of frame 1014. This sleeve surrounds the left-hand end of shaft 264 and also fits in an aperture provided at the lower end of frame 265 (Fig. 13). A nut 1016b is screwed to the end of sleeve 1016 to hold the parts in proper position. Gears 277, 296, and 309, it will be remembered, are loosely pivoted on sleeve 1016.

Loosely pivoted on sleeve 1016 adjacent frames 265 and 1014, respectively, is a pair of bell crank levers 1020 and 1021 (Figs. 14 and 15), which levers are integrally connected by means of tie rods 1022 and 1023. The rod 1022, as will be pointed out hereinafter, is provided to restore the beams 1003 to normal position. The rearwardly extending arms 1024 and 1025, respectively, of bell crank levers 1020 and 1021 are provided at their free ends with contacting surfaces 1026 and 1027 which are adapted to be engaged by a pair of rollers 1028 and 1029, respectively, extending laterally from a pair of arms 1030 and 1031 of a yoke member 1032 pivoted on a rod 1033 journaled in the supporting frames 11 and 13. Yoke 1032 is adapted to be rocked at the proper time by means of a rearwardly extending arm 1034 (Fig. 13) integral therewith, which is engaged by a pin 1035 extending laterally from a gear 1036 pinned to the main rotation shaft 20.

The operation of the parts just described is as follows:

Upon operation of the machine after a key in each group has been depressed, the differential segments 242 associated therewith will, through the transmission line, actuate gears 277, 296, and 309 (Fig. 2) in the manner described hereinbefore. These gears, in turn, will actuate their related gear segments 1000 (Fig. 15) in a counter clockwise direction. By this action, the beams 1003 will be actuated about the concentric surfaces 1008 provided on segments 1000 thereby rocking segmental gears 1006 in a counter clockwise direction, which gears in turn will actuate gears 1009 to position the related type carriers 1011 (Fig. 31) the proper amount. When the type carriers 1011 have been adjusted in this manner, they will be locked in position by holding detents 1043 (Fig. 15) in a manner which will be hereinafter described. Upon further operation of the machine, gears 277, 296, and 309 will be restored to normal position bringing segmental gears 1000 also to normal position. However, since gears 1009 are locked against movement, gear segments 1006 will also be held against movement with the result that beams 1003 will fulcrum about studs 1005 as pivots, and thus be caused to move away from the concentric surfaces 1008 provided on segmental gears 1000. When the beams 1003 are moved in this manner they in turn will rock bell crank levers 1020 and 1021 in a counter clockwise direction. This action is permitted since, at this time, stud 1035 (Fig. 13) carried by gear 1036 will be out of engagement with arm 1034 of yoke member 1032. Now, upon a subsequent operation of the machine, gears 277, 296, and 309 will again be adjusted by their respective differential segments 242 to again actuate their cooperating segmental gears 1000 in the manner previously described. This action takes place after locking detents 1043 have been moved out of engagement with gears 1009. At the same time, stud 1035 will engage arm 1034 to rock bell crank levers 1020 and 1021 in a clockwise direction causing rod 1022 to engage the beams 1003 to restore them against the surfaces 1008 of gears 1000. Thus it is seen that beams 1003 are actuated both toward the concentric surfaces 1008 of segments 1000 and also about these surfaces as a center with the result that their related segmental gears 1000 and type carriers 1011 will be adjusted an amount corresponding to the resultant of these movements. Thus it is clear that the type carriers 1011 will be adjusted to their new position without first being restored to zero.

Referring to Figs. 13, 14, and 15, it will be seen that the supporting frames 265 and 1014 for the transmission line are each provided, at a point slightly above its pivot, with an apertured projection 1040 for receiving a supporting rod 1041. Pivoted on rod 1041 and overlying each gear 1009 is a locking pawl 1042 provided with a detent 1043 which is adapted to engage the teeth of its associated gear 1009. An eccentric hub 1044 which extends from a spacing disc 1045 extends into the pivot aperture of each pawl, as shown in Fig. 14. This mechanism is provided to enable manual adjustment of the pivot of the pawls so that each may be individually adjusted to insure proper alinement of the gears 1009. All of the spacing discs 1045 are normally held firmly in position by a cross-bar 1046 (Figs. 14 and 15) mounted in the extensions 1047 and 1048 of a bail 1049 also pivoted on the rod 1041 adjacent the frames 265 and 1014. The locking bar 1046 is provided with a depression 1046' along substantially its full length so that by merely turning this bar to bring this depression adjacent the discs 1045, adjustment of the hubs can be readily effected, after which the bar may be returned to its original position and locked in any suitable manner. As best shown in Fig. 14 the bail 1049 overlies all of the locking pawls 1042 and a coil spring 1050 (Fig. 15) is interposed between each pawl 1042 and the bail so that when the parts are in the position shown in these figures, the gears 1009 can be rotated against the slight tension of the springs 1050. However, during the early part of an operation of the machine or immediately after the gears 1009 have been adjusted by the differential segments, the bail 1049 will be moved downwardly to rest substantially against the pawls 1042 and thereby prevent any further movement of the gears 1009. To move the bail 1049 to locking position, a lever 1051 pivoted at 1052 is provided. The forwardly extending arm of lever 1051 lies over a stud on the arm 1049a of bail 1049 while the rearwardly extending end of lever 1051 is adapted to engage the periphery of a large disc 1053 pinned to a gear 1148. When the parts are in their normal position a notch 1054 in the disc 1053 registers with the end of lever 1051 to permit movement of the bail 1049 and also adjustment of the associated parts.

The consecutive numbering device associated with the check and slip mechanism consists of five type wheels 1060 (Figs. 31 and 33) mounted upon the shaft 1012. These type wheels like the type wheels 1011 are provided with two similar sets of type. These type wheels are of the usual construction, each having a ratchet wheel 1061 attached thereto which is adapted to be engaged by a multi-pronged pawl 1062. Pawl 1062 is given an oscillatory movement by a bail 1063 as shown in Figs. 30 and 32. This type of mechanism is well known in the art as the deep notch type.

Bail 1063 is loosely mounted on shaft 1012 and has integral therewith a gear segment 1064 which meshes with a gear 1065 fixed to shaft 1066. Also fixed to shaft 1066 is a gear 1067 which meshes with gear segment 1068 fixed to a disc 1069. Disc 1069 is provided with a stud 1069' which engages a notch 1070a of a disc 1070 pivoted on rod 1071. Disc 1070 is also formed with a second notch 1070b into which projects a stud carried by the upper arm of a lever 1072 associated with the ribbon mechanism for the check and slip printer. Arm 1072 is oscillated by cams 1132 at each operation of the machine by mechanism which will be fully described hereinafter. Thus, it is seen that through the connections shown in Fig. 30, when disc 1070 is rocked by lever 1072, disc 1069 will rock shaft 1066, causing gear 1065 thereon to actuate bail 1063. Pawl 1062 carried by bail 1063 will then be actuated to operate counter 1060 to register a unit therein.

The consecutive counter associated with the check and slip printing mechanism corresponds at all times with the consecutive number counter provided in the totalizer reel and which is shown fully in the parent case. As was stated before, the pawl 1062 (Fig. 33) for actuating the printing consecutive counter 1060 is actuated at each operation of the machine. Therefore, it will be necessary to provide a mechanism for disabling this counter for charge and no sale transactions. To this end a throw out pawl 1074 (Fig. 32) is provided which cooperates with a notched disc 1075 riveted to the type carrier 1011 carrying the transaction type characters. Pawl 1074 (Fig. 32) is loosely pivoted upon the hub 1065' of gear 1065 and is formed with a nose portion which engages disc 1075. For charge and no sale transactions, pawl 1074 contacts with the outer or concentric portion of disc 1075. When in this position the outer end of pawl 1074 will engage an extension 1076 provided on the counter actuating pawl 1062 and the latter will thus be held out of engagement with the associated ratchet wheels 1061. However, during an operation of the machine for cash, received on account, and paid out transactions, the type carrier 1011 aforesaid will be adjusted in such a manner that the notches 1075' of disc 1075 will be brought into registering position with respect to the nose of pawl 1074 thereby releasing pawl 1062 for operation, which pawl then moves into engagement with the ratchet wheels by virtue of spring 1062'. It is understood, of course, that the operations of the parts are so timed that movement of disc 1075 is completed before pawl 1062 is actuated by the member 1063.

The consecutive counter in the reel and the consecutive number counter 1060 associated with the check and slip printing mechanism can be simultaneously reset to zero. The connections leading from the resetting mechanism to the counter 1060 are fully described in the parent case and will not be described herein, as they do not form a part of the invention claimed herein.

Referring to Fig. 31 it will be seen that adjacent the consecutive numbering type carriers are four date type wheels 1095, each of which is adapted to be set manually by a corresponding knurled knob 1096 extending to the left of the type line. This mechanism is well known in the art and therefore a detailed description thereof is unnecessary. It may be stated, however, that the knurled knobs 1096 are suitably connected to the type wheels 1095 by nested sleeves mounted on shaft 1012 in a well known manner and that adjustment of the knobs will consequently adjust the type carriers. The knobs 1096 are indexed in the usual manner so that the position of the type carriers associated therewith may be ascertained. The two remaining type carriers 1098 located to the left of the date wheels 1095 are provided for printing information often desirable in certain business systems. For example, it may be desired to print a character identifying the machine from which the checks have been issued as well as to print a character designating the particular store in which the machine is installed. For this reason, one of the type wheels 1098 bears numbers designating the machine while the other bears the number assigned to the store in which the machine is located. It will be noted that all of the date wheels 1095, and the type wheels 1098, are held in position by spring pressed detent pawls 1099 carried by a bar 1118 (Fig. 34). These pawls cooperate with notched disks 1099' secured to the type wheels 1095 and 1098. The type wheels 1098 have no outer connections for adjusting them since their position is not changed after the machine has been installed. Therefore, these wheels are set before the cabinet is placed upon the machine. However, if at any time it is desired to change the positions of these wheels, access may be had thereto through a door located at the left of the machine.

The inking ribbon 1100 (Fig. 22) associated with the check and slip printing mechanism is carried by a pair of spools 1101 and 1102 pivotally supported on studs 1103 and 1104, respectively, provided in a supporting frame 1106. Fixed to and projecting inwardly from frame 1106 are three supporting rods 1107, and a tube 1108. The rods 1107 are adapted to extend into apertures 1109 (Fig. 18) provided in main supporting frame 11, and in a bracket 1110. Bracket 1110 is rigidly secured to side frame 11 by screws 1111. Tube 1108 (Fig. 22) embraces a rod 1071 (Figs. 18 and 22) which is fixed to and extends outwardly from the side frame 11. The frame 1106 (Figs. 22 and 35) carries at its outer side a circular bracket 1113 (Fig. 35) which projects slightly beyond the left side of the cabinet. Bracket 1113 is provided with large openings 1114 to permit access to the knobs 1096 (see also Fig. 31) for adjusting the date type wheels 1195. Bracket 1113 is provided mainly to form a support for the outer end of shaft 1012 which shaft it will be remembered supports all of the type wheels for the check and slip printing mechanism. The ribbon frame is held in position by means of screws 1116 and 1117 as shown in Fig. 35, the screw 1116 being attached to the outer end of rod 1071 while the screws 1117 are fastened to one end of a spacing block 1118, which block is fastened at its other end to the bracket 1110 (Fig. 18). In order to hold the ribbon spools 1101 and 1102 (Fig. 22) on their supporting studs 1103 and 1104, so that they may be removed from the machine when the ribbon frame 1106 is drawn outwardly, a retaining member 1120 is provided (Figs. 35 and 36), which is adapted to slide in a slot 1121 provided in plate 1106. Member 1120, due to gravity, normally lies at the bottom of slot 1121 and carries a disc 1122 which is adapted to engage the inner sides of the flanges 1123 provided on spools 1101 and 1102, so that when the frame is removed from the machine the spools being thus held in place will also be removed from the machine. If it is desired to remove the ribbon spools from their studs, it is only necessary to move the member 1120 upwardly so as to disengage disc 1122 from the flanges of the spools.

As shown in Fig. 22, the inking ribbon 1100 passes from the rear spool 1102 over the top of guide roll 1125, thence forwardly over another guide roll 1126, thence downwardly and rearwardly over the guide rolls 1127 and 1128, thenceabout spool 1101. Thus it is seen that a single ribbon may be used for both the check and slip printing mechanisms. From the above construction it is clear that when it is desired to replace a ribbon it is only necessary to remove the screws 1116 and 1117 (Fig. 35) and pull the structure outwardly until the tube 1108 has cleared the rod 1071. Since the rods 1107 and tube 1108 (Fig. 22) are secured to plate 1106, the ribbon guides as well as the spools themselves will be removed as a unit.

The mechanism for feeding and reversing the inking ribbon 1100 is similar to that associated with the record strip printing mechanism fully described in the parent case, and therefore it is unnecessary to describe this mechanism in detail. Referring to Fig. 30, it will be seen that a member 1072 is provided to actuate the ribbon feeding pawl 1072' at each operation of the machine. This member is pivoted upon a cross rod 1130 and carries a pair of rollers at its lower end, which rollers engage cams 1132 pinned to a flange on one end of a sleeve 1133 (see also Fig. 17). This sleeve is fixed to gear 1298 which, as will be hereinafter described, is given a complete rotation at each operation of the machine and therefore member 1072 will be rocked to feed the inking ribbon, step by step, to present a different portion of the ribbon to the printing line at each operation of the machine. The ribbon spools 1101 and 1102 (Fig. 36) are each provided with a key 1134' which engages in a slot provided in drivers 1134 therefor (see also Fig. 30), and thus a driving connection is established between these parts.

The mechanism for printing, feeding, perforating, and severing the issued checks will now be described in detail. These mechanisms are located above the ribbon frame just described and extend slightly to the rear thereof, as is clearly shown in Figs. 16, 22, and 35.

Referring to Fig. 13, it will be seen that the gear 1036 fixed to the main driving shaft 20 meshes with an intermittent gear 1137 fixed to shaft 653. These gears are so constructed that the gear 1036 is moved independently of gear 1137 during its first 90° of movement, thus allowing the type carriers 1011 (Fig. 31) to be adjusted before any movement is imparted to gear 1137 (Fig. 13). Gear 1137, as was pointed out before, is fixed to a short shaft 653, which shaft has also fixed thereto another gear 1139 (Figs. 15 and 16), which gear in turn meshes with a large gear 1140 loose on shaft 386. Gear 1140 meshes with an idler gear 1141 pinned to a stud shaft 1142 which is journalled in suitable bearings in side frame 11. Shaft 1142 at its outer end has pinned thereto a similar gear 1142' (Figs. 16 and 18) which meshes with a gear 1143 pivoted on a stud 1144 projecting outwardly from side frame 11 and held in place by means of a screw 1143'. This gear meshes with a gear 1145 (Figs. 15 and 16) loosely mounted on the shaft 1135, which shaft carries the actuating means for operating the printing, feeding, perforating and severing mechanisms for the issued checks. Normally the shaft 1135 will not be rotated since gear 1145 is loosely mounted thereon. However, for cash, received on account, and paid out transactions, certain mechanism will be operated to cause coupling of gear 1145 with the shaft 1135, with the result that the check issuing mechanism will then be operated. The mechanism for causing this coupling action to take place between gear 1145 and the shaft 1135 will now be described in detail.

Referring to Figs 16, 18, and 19, it will be seen that gear 1145 has fixed thereto a hub 1146 formed with a projection 1147. This projection is adapted to be engaged by a hook provided on a pawl 1148 pivoted at 1150 upon a gear 1151 which gear is pinned to the shaft 1135. Pawl 1148 is provided at its forward end with a pin 1152 which projects through an enlarged opening 1153 formed in gear 1151 and is adapted to normally engage in a notch 1154 provided in a stationary disc 1155. Disc 1155 is loosely mounted on the shaft 1135 and lies adjacent to gear 1151. This disc is held against movement by a pin 1156 extending from the supporting frame 11, as shown in Fig. 16. Pin 1152 is held in notch 1154 of the stationary disc 1155 by a projection 1157 formed on a spring urged link 1158. Thus it is seen that pawl 1148 is normally held out of engagement with projection 1147 of hub 1146 and therefore the check issuing mechanism is prevented from operating. Attached to the upper end of link 1158 and loosely mounted on shaft 1135 adjacent the stationary disc 1155 is a segmental cam plate 1159. The cam portion 1160 of plate 1159 normally rests upon stud 1152, as shown in Fig. 18. The lower end of link 1158 is provided with a stud 1158' which is engaged by the hook portion 1161' of a lever 1161 pivoted at 1162 to side frame 11. The rearward end of lever 1161 is provided with a projection 1163 which is adapted to co-operate with a cam 1164, as shown in Fig. 18. Cam 1164 is fixed to a bushing 1165 which in turn is pinned to shaft 269 of the transmission mechanism. It will be remembered that shaft 269 receives its motion from the differential segment 242 associated with the transaction bank of keys. Cam 1164 will thus be adjusted according to the extent of movement of the transaction differential 242. As shown in Fig. 18, when the cash key is depressed and the machine subsequently operated, the raised portion of cam 1164 will engage projection 1163 of lever 1161 thereby rocking the latter in a counterclockwise direction about pivot 1162, causing the hook portion provided at the forward end of lever 1161 to move link 1158 downwardly against the tension of its spring. By this action, cam 1159 will be rocked in a counterclockwise direction thereby rocking pawl 1148 in a counterclockwise direction (as viewed in Fig. 19) causing the hook portion provided at the end thereof to engage projection 1147 of hub 1146. Gear 1145 will thus be coupled to gear 1151. The latter, it will be remembered, is pinned to shaft 1135. Now, upon a further operation of the machine, gear 1145 will actuate shaft 1135 to cause a check to be issued. By inspection of the raised portions of cam 1164, it is seen that for received on account and paid out transactions also, lever 1161 will be rocked in a counterclockwise direction to effect coupling of gear 1145 with shaft 1135, and thus a check will be issued for received on account and paid out transactions also. For a charge transaction, a cut-away portion of cam 1164 will be moved in alignment with projection 1163 and, consequently, gear 1145 will not be coupled to shaft 1135, with the result that no check will be issued for a charge transaction. The same is true for no sale transactions in that lever 1161 will not be held in operated position to effect coupling of gear 1145 with shaft 1135. Thus it is seen that a check will be issued only for cash, received on account, and paid out transactions.

Referring to Figs. 16, 22, and 35, it will be seen that shaft 1135 is journalled in a pair of supporting frames 1170 and 1171. These frames are held in spaced relationship by connecting tubes 1172. Each tube 1172 is mounted on a laterally extending rod 1173 which is riveted to side frame 11. The outer end of each rod 1173 is provided with an internal thread for receiving an assembling screw 1174, as shown in Figs. 16 and 35. Thus by removing the screws 1143' and 1174 and the gear 1143, the frames 1170 and 1171 and the parts supported thereby may be removed from the machine.

Referring to Fig. 22, it will be seen that a platen 1175 is provided to effect printing impressions from the type wheels upon the issued checks. Platen 1175 is guided in grooves 1176 and 1177 (Fig. 16) formed in the supporting frames 1170 and 1171. Fitted within the platen frame is an impression block 1178. Platen 1175 is adjustably supported by a pair of operating arms 1179. These arms are pivoted intermediate their ends on a rod 1180 supported by frames 1170 and 1171 and are connected at their upper rear ends by a pin 1181 upon which is mounted an anti-friction roller 1181', as shown in Figs. 16 and 22. A cam 1182 fixed to shaft 1135 is adapted to engage roller 1181' to actuate platen 1175 to effect printing upon the issued checks. A spring 1184 urges arms 1179 in a clockwise direction and thus retains the impression block 1178 out of engagement with the type carriers except when it is actuated by cam 1182 to effect printing upon the checks. As was pointed out hereinbefore, mechanism is provided to regulate the number of printing impressions to be effected by platen 1175 during an operation of the machine so that either "straight" checks or "stub" checks may be issued. This mechanism will now be described in detail.

Referring to Figs. 16 and 21, it will be seen that a pawl 1186 is pivoted at 1187 to a cam 1182. This pawl is provided with a cam portion 1188 which is adapted to engage roller 1181' when cam 1182 is actuated. Pawl 1186 has attached thereto an anti-friction roller 1189 which engages a snail cam 1190 loosely mounted on shaft 1135. Cam 1190 is connected to an arm 1192 by a sleeve 1191, Fig. 16, loosely mounted on shaft 1135. Arm 1192 (Fig. 21) is provided with a laterally extending stud 1192' which projects into an open slot provided in a spring urged plunger 1196 which is slidably mounted on the rearwardly extending arm 1194 of a lever 1193. Lever 1193 is loosely mounted on the sleeve 1172, provided on rod 1173. The substantially vertical arm 1197 of lever 1193 extends through a slot provided near the top of the cabinet, as shown in Fig. 22. The rearwardly extending arm 1194 of lever 1193 is also provided with an open slot for receiving the stud 1192' provided on arm 1192. Arm 1194 of lever 1193 is also provided with a pair of guiding extensions 1195 for the purpose of holding the parts in proper position.

As shown in Fig. 21, pawl 1186 is held in position by means of a tail integral therewith which engages a collar on shaft 1135 (see Fig. 16). Fig. 21 shows the position of the parts when lever 1193 is in "stub" check position. When the parts are in this position and cam 1182 is rotated in the direction of the arrow in Fig. 22, cam portion 1188 of pawl 1186 will first engage roller 1181' to rock platen 1175 downwardly to effect a printing impression upon the check strip. Shortly thereafter, cam portion 1183 of cam 1182 will engage roller 1181' and again cause a printing impression to be made upon the check. Adjacent to the arm 1197 of lever 1193 is provided an index plate bearing the legends "straight" check and "stub" check. When arm 1197 is swung downwardly to "straight" check position, the rearwardly extending arm 1194 thereof will swing upwardly with the result that arm 1192 will be swung in clockwise direction to carry the raised portion of cam 1190' to the right of its normal position. It is also seen that when lever 1193 is swung in this manner and pin 1192 passes beyond the center line connecting the pivot points of arm 1194 and arm 1192, the spring surrounding the plunger will exert a force on arm 1192, thereby tending to rock the same in a clockwise direction about its pivot until the lower extension 1195 provided at the rear end of arm 1194 engages a sleeve on shaft 1135, thus limiting the movement of arm 1192 and lever 1193.

When the parts are in the position shown in Fig. 21, it is seen that the upper extension 1195 of arm 1194 limits the movement of the parts when lever 1193 is moved to "stub" check position. The operation of the parts just described, when lever 1193 is moved to "straight" check position is as follows. When lever 1193 is moved downwardly from the position shown in Fig. 22, the rearwardly extending arm 1194 will be moved upwardly carrying plunger 1196 with it, with the result that arm 1192 will be rocked about shaft 1135 in a clockwise direction until the lower extension 1195 stops the movement. The spring surrounding plunger 1196 will tend to retain the parts in this position. By this action the raised portion 1190' of cam 1190 will be moved to the right of its normal position. Now, upon movement of cam 1182, as aforesaid, pawl 1186 will be carried therewith and when cam portion 1188 of pawl 1186 reaches roller 1181', the roller 1189 carried by pawl 1186 will register with the reduced portion of cam 1190. Consequently, pawl 1186 will be rocked slightly in a clockwise direction bringing the cam portion 1188 thereof toward the shaft 1135 and therefore no motion will be imparted to platen 1175. Upon continued movement of cam 1182, however, when the raised portion 1183 thereof engages roller 1181', the platen will be lowered to effect a printing impression upon the check. Thus, it is seen that when the lever 1193 is in "straight" check position, only one impression will be made upon the check. When lever 1193, however, is moved upwardly to "stub" check position, the parts will again assume the position shown in Figs. 21 and 22. The raised portion 1190' of cam 1190 will then be effective to hold pawl 1186 in operative position so that the cam portion 1188 thereof when brought into engagement with roller 1181' will actuate platen 1175 to effect a printing impression upon the check. Shortly thereafter the raised portion of 1183 of cam 1182 will engage roller 1181' to effect a second impression upon the check.

The check material is drawn from a storage roll 1200 (Fig. 22) supported on a rod 1201, one end of which is riveted to supporting frame 11 (Fig. 16). From the storage roll 1200, the check strip passes through a guide channel 1202 (Fig. 22) and thence between two sets of electro rolls 1255 and 1256 and their cooperating feeding rollers 1203 and 1204, respectively. The strip then passes over a block 1205 associated with the perforating and severing mechanism and thence through a second guide channel and over the type carriers where it receives a printing impression, and thence through an opening provided at the front of the cabinet. As shown in Figs. 16 and 22, a lever 1208 is pivoted upon rod 1180 near the right-hand end thereof. The rearwardly extending arm 1209 of lever 1208 carries a pair of rollers 1210 which cooperate with a cam 1211 and its companion cam which are secured to the shaft 1135. The forward end 1212 of lever 1208 is provided with a substantially L-shaped slot 1233. Projecting into slot 1233 is a stud 1213' provided at the upper end of a link 1213. The lower end of link 1213 is pivoted to a rockable member 1214 pinned to a rod 1215, journalled in supporting frames 1170 and 1171.

Referring to Fig. 25, it will be seen that rod 1215 has fixed thereto a second rockable member 1214' similar to member 1214. The forward ends of members 1214 and 1214' extend through a slot provided in a reciprocating blade 1216. Blade 1216 is guided in slots 1217 and 1218 provided in supporting frames 1170 and 1171, respectively. Blade 1216 is provided with the usual cutting edge which cooperates with a straight edge 1221 (Fig. 22) fixed to block 1205. The rearward ends of members 1214 and 1214' (Fig. 25) project into slots provided in a perforating member 1220 which is fixed to a supporting bar 1219. Bar 1219 is also guided in slots provided in supporting frames 1170 and 1171.

Figure 5:
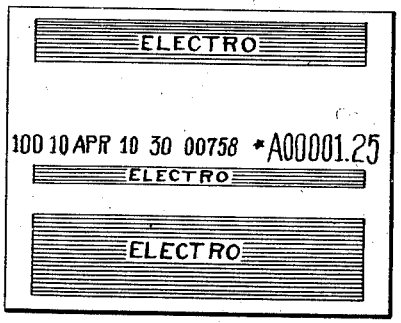
Fig. 5 shows a sample of a check bearing a single impression.
Figure 6:
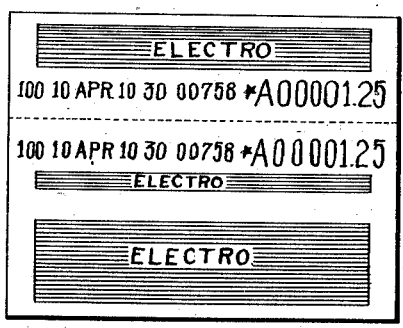
Fig. 6 shows a sample of a check bearing a double impression with a perforation between the two imprints.
Figure 7:
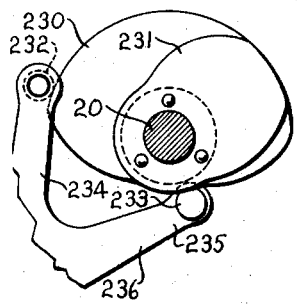
Fig. 7 is a detail view of the cams for operating the driving members associated with the amount differential segments.

Referring to Fig. 22, it will be seen that the perforating member 1220 cooperates with a pad 1222 composed of soft material. This is provided to form a bearing for the portion of the check paper acted upon by the perforating member, and at the same time prevent destruction of the serration of the said edge during the perforating operation. Fig. 22, it will be remembered, shows the position of the parts when lever 1193 is in "stub" check position. When the parts are in this position and the machine is subsequently operated, it will be seen that lever 1208, through its connection with cam 1211 and its companion cam, is first rocked in a clockwise direction about rod 1180. By this action members 1214 and 1214' will be rocked in a clockwise direction with the result that the serrated edge of member 1220 will be brought into engagement with the check to perforate the same. During the continued movement of the cam 1211 and its companion cam, the feeding rollers 1203 and 1204 will become effective to feed the check strip its first step of movement. Following this, platen 1175 will be operated to effect a printing impression upon the check. Upon further operation of the machine, feeding rollers 1203 and 1204 will become effective to advance the strip a second step after which a second printing impression is made upon the check. Immediately after the last printing impression, lever 1208 will be rocked in a counterclockwise direction by cam 1211 and its companion cam, which movement imparts a counterclockwise movement to members 1214 and 1214' with the result that blade 1216 will be lowered sufficiently to sever the check from the strip. After these operations, the check will have been moved into the channel 1225 and the end portion thereof will protrude outwardly sufficiently to enable the operator to remove the same. The forward end of the check strip now lies adjacent the blade 1216. A sample of the matter printed upon the check is shown in Figs. 5 and 6. The electro rolls 1255 and 1256 print advertising matter upon the check strip as it is fed from the roll 1200.

When it is desired to issue "straight" checks, lever 1193 is moved downwardly as described hereinbefore to so condition the mechanism that only one printing impression will be made upon the check strip. When it is desired to issue such checks, the perforating mechanism is also disabled. The mechanism for disabling the perforating means will now be described in detail.

Referring to Fig. 22, it will be seen that lever 1193 is provided with a downwardly extending arm 1231 having an arcuate slot 1230 provided at the lower end thereof. Stud 1213' secured on the upper end of link 1213 and extending through lever 1208, also extends into slot 1230. Thus, it is seen that when lever 1193 is rocked downwardly link 1213 will be swung rearwardly about its pivot thereby bringing stud 1213' into the enlarged portion of slot 1233 provided at the forward end of lever 1208. Now, upon an operation of the machine, it will be seen that when cam 1211 and its companion cam actuate lever 1208 in a clockwise direction, no motion will be imparted to members 1214 and 1214', and to the perforating member 1220. However, later in the cycle of movement of cam 1211 and its companion cam, lever 1208 will be rocked in a counterclockwise direction to actuate blade 1216 to effect severance of the check, in the manner previously described. Thus, it is seen that a simple mechanism is provided which effectively disables the perforating means when "straight" checks are to be issued.

In order to protect the check strip against the operating parts as well as to prevent the strip from buckling during operation of the perforating and severing mechanisms, a guard 1235 is provided. This guard is located substantially between the blade 1216 and perforating member 1220 and is retained in its position by a pair of upwardly extending apertured ears 1236, through which rod 1215 extends, as shown in Fig. 22. This guard also acts as a guide for the check strip so that it will readily pass through the channel 1225 formed in the guard plate 1226.

As was stated hereinbefore, two sets of feeding rollers are provided to advance the check strip step-by-step during the printing and perforating operations. To produce this action, a train of gears operating intermittently is provided. As shown in Figs. 16, 18, 22, 25, 26, 28, and 29, the gear 1151 (Figs. 16 and 18) fixed to the shaft 1135, meshes with a gear 1243 (Figs. 18 and 29) mounted on a collar 1244 journalled on rod 1242. This gear has fixed thereto a gear 1240 also mounted on collar 1244. Gear 1240 meshes with a gear 1246 having fixed thereto a collar 1247 journalled on a rod 1248. Both of these rods are riveted at one end to the supporting frame 11. Collars 1244 and 1247 are each provided with a slot 1249 (slot 1249 in collar 1244 being shown in Figs. 25 and 29), for receiving a projection 1249' extending from electro rolls 1255 and 1256 (Fig. 26). The electro rolls 1255 and 1256 are loose on rods 1242 and 1248, respectively. Therefore, it is seen that when the gear 1151 (Fig. 18) is rotated it will intermittently rotate the gears 1243 and 1246 and through the connections just described will rotate electro rolls 1255 and 1256 (Fig. 22) which, it will be remembered, cooperate with the feeding rolls 1203 and 1204, respectively, to feed the check strip. The electro rolls 1255 and 1256 may print any desired form of advertising matter upon the checks as they are fed from the supply roll 1200. A pair of inking rolls 1257 and 1258 cooperate with electro rolls 1255 and 1256, respectively, and thus, supply the same with the necessary ink to effect printing upon the check strip. The inking rolls 1257 and 1258 are each supported by a pair of integrally connected arms 1267 (Fig. 26) pivotally mounted on rods 1263 and 1266, respectively. Rod 1263 (Fig. 28) is supported at one end in the upper portion of plate 1260 and at the other end in a plate 1261 (Fig. 26), while rod 1266 (Fig. 28) is supported at one end in the plate 1260 and at its other end in plate 1262 (Fig. 26). As shown in the above mentioned figures, the rods 1242 and 1248 supporting the electro rolls 1255 and 1256 respectively, are fixed at one end to side frame 11, while the other end thereof is supported in plate 1260. Plates 1261 and 1262 are rigidly secured to plate 1260 in spaced relationship thereto by tie rods 1263, 1264, 1265 and 1266.

The pressure feeding rollers 1203 and 1204 which, it will be remembered, cooperate with electro rolls 1255 and 1256, respectively, are tubular in form. An eccentric core 1269 (Fig. 22) is fitted with each pressure roll 1203 and 1204. The rod 1275 for pressure roll 1203 projects into the core 1269 associated with the pressure roll 1203 while the rod 1276 projects into the core 1269 associated with the pressure roll 1204. The core 1269 associated with the pressure roll 1203 has fixed to the outer end thereof a pinion 1271 (Fig. 28) while a similar pinion 1272 is fixed to the core 1269 associated with the pressure roll 1204. An adjusting gear 1273 meshes with pinions 1271 and 1272, as shown in Figs 28 and 29. Gear 1273 is fixed to a locking plate 1274 which plate is pivoted upon a shouldered screw 1275' fixed to plate 1260.

From the construction of the parts just described, it will be seen that in order to adjust the pressure rolls 1203 and 1204, it is only necessary to rock plate 1274 to slightly rotate gear 1273 which in turn will impart motion to gears 1271 and 1272, respectively, to adjust the pressure rolls either toward or away from their respective electro rolls depending upon whether a greater or lesser amount of pressure is desired between these sets of rolls.

For the purpose of retaining the parts in adjusted position, locking plate 1274 is provided with notches 1277 and 1278 which are adapted to engage in annular grooves 1279 provided at the outer ends of rods 1242 and 1248, respectively. From the construction of the parts just described, it is seen that when it is desired to reinserted sales slips when the machine is operated for charge transactions. However, it is obvious that the cam 1309 may be so designed that any desired number of printing impressions may be effected upon the sales slip. For example, it is often desired to effect triplicate printing upon sales slips, and to sever a portion thereof carrying one of the printing impressions. This portion is then deposited in a retaining compartment contained within the machine. Such a construction obviously may be provided in the illustrated machine by slightly modifying the present construction of the parts. Referring to Fig. 22, it will be seen that the sales slips are inserted between the guide plate 1312 and the table 1313. These slips may be positioned by any suitable means, such as engraved lines provided on the table. By such a device the slips may be properly positioned in the machine to receive printed impressions thereon. Adjustable devices may also be provided so that slips of different sizes may be used. The table 1313 is provided with a suitable opening 1314 which permits the impression block 1303 to pass therethrough to effect a printing impression upon the inserted slips from the lower set of type provided on the type wheels previously described. To hold the slip in proper position during a printing operation, and also to feed the same between printing impressions, the following mechanism is provided.

Referring to Figs. 22, 23, 24, and 27, it will be seen that a pair of curved arms 1315 and 1316 (Figs. 22 and 27) are pinned to a cross rod 1317 journalled in side frame 11 and auxiliary frame 1290. Pressure feeding rollers 1319 and 1320 are supported on a rod 1318 journalled in the forward ends of arms 1315 and 1316. Integral with arm 1315 is a depending arm 1325 which carries an anti-friction roll 1326 (see also Fig. 23) at the lower end thereof, which is engaged by a cam 1327 fixed to shaft 1291. Thus, it is seen that when the machine is operated, cam 1327 will rock arms 1315 and 1316 in a clockwise direction to bring pressure rollers 1319 and 1320 upwardly into engagement with a cooperating roll 1321. In this manner the slips are held against movement. Loosely mounted on shaft 1317 and adjacent to arm 1315, as shown in Fig. 27, is a segmental gear 1328 which meshes with a pinion 1332 fixed to shaft 1318. The depending arm 1329 (Figs. 22 and 24), of segment 1328 is provided with an anti-friction roll which engages a cam 1330, also fixed to shaft 1291, as shown in Fig. 24. Cam 1330 is so constructed that no movement will be imparted to segmental gear 1328 until cam 1327 has rocked arms 1315 and 1316 upwardly to bring rollers 1319 and 1320 into engagement with roll 1321. When this occurs, cam 1330 will rock segmental gear 1328 in a clockwise direction thereby rotating feeding roller 1320 in a counterclockwise direction to feed the inserted slip between printing impressions. By inspection of the cams 1310, 1327 and 1330, it is seen that cam 1327 will first rock impression rollers 1319 and 1320 into engagement with their cooperating roll 1321. During this action segmental gear 1328 will be carried upwardly a slight distance through its associated cam 1330. When shaft 1291 has been rotated through substantially 180°, the first cam portion 1310 of cam 1309 will actuate the platen 1302 to effect the first printing impression upon the inserted slip. Upon continued movement of shaft 1291, the enlarged portion of cam 1330 will rock segmental gear 1328 in a clockwise direction, as viewed in Figs. 22 and 24, which movement is imparted to rollers 1319 and 1320 causing the latter to rotate slightly in a counterclockwise direction in the manner aforesaid, to feed the inserted slips the proper distance. When the slip has been brought to rest after being fed in this manner, the second cam portion 1311 on cam 1309 will actuate platen 1302 to effect a second printing impression upon the inserted slips. By this time, the reduced portion of cam 1327 will register with roller 1326 and the feeding rollers 1319 and 1320 will be lowered out of engagement with the inserted slip by gravity. It will also be seen that the reduced portion of cam 1330 will also be brought into registering position with respect to the anti-friction roller carried by depending arm 1329 of segmental gear 1328, and thus the latter will also be restored to normal position either by gravity or by a spring not shown. The slip may then be removed from the machine by the operator.

Mechanism is also provided to disable the check issuing mechanism for all transactions when it is desired to operate the same without issuing a check. Referring to Fig. 18, it will be seen that a bell crank lever 1340 is pivoted on a stud extending laterally from side frame 11, and projects through a slot formed in the front of the cabinet. The upwardly and rearwardly extending arm of lever 1340 is provided with an open slot for receiving the stud 1158' provided at the lower end of link 1158. A spring-urged detent 1344 is provided with two notches for receiving a laterally extending stud 1343 provided near the forward end of lever 1340. Thus it is seen that when it is desired to disable the check issuing mechanism, it is only necessary to rock lever 1340 in a clockwise direction about its pivot. By this action link 1158 will be moved rearwardly a slight distance to bring the stud 1158' carried thereby into the enlarged portion of the hook 1161' provided at the upper end of lever 1161. When the parts are in this position it is seen that when the raised portion of cam 1164 engages projection 1163 of lever 1161, the latter will be rocked in a counterclockwise direction about its pivot 1162, but due to the fact that stud 1158' of lever 1158 is now positioned within the enlarged portion of hook 1161', no motion will be imparted to link 1158 and thus the shaft 1135 will not be coupled to the driving mechanism therefor. Consequently no check will be issued. When lever 1340 is moved in this manner, it is seen that stud 1343 will engage into the upper notch provided in detent 1344, and lever 1340 will be held in its adjusted position. From this construction it is clear that since the check feeding, perforating, severing and printing mechanisms are operated upon rotation of shaft 1135, they will remain inoperative until lever 1340 is moved downwardly to the position shown in Fig. 18. These mechanisms will then be conditioned to issue a check for cash, received on account and paid out transactions in the manner previously described.

While the form of mechanism herein shown and described in admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, a plurality of type carriers having two sets of similar move this unit from the machine, plate 1274 is first rocked to disengage its notches 1277 and 1278 from the grooves 1279, aforesaid. By this action the pressure rolls 1203 and 1204 will be moved away from their related electro rolls 1255 and 1256, respectively. Then by simply drawing plate 1260 outwardly the pressure rolls 1203 and 1204 will be drawn from their supporting rods 1275 and 1276 (Figs. 22, 28, and 29). It is clear that since the rods 1242 and 1248 supporting electro rolls 1255 and 1256 are fixed to frame 11, these rolls will remain in place during the removal of the other parts just mentioned. However, when the parts just described have been removed access may be had to the electro rolls for adjusting the same or changing the electro type provided thereon. The inking rolls 1257 and 1258 being attached to the plate 1260 in the manner previously described will also be removed when plate 1260 is drawn outwardly. The plates 1261 and 1262, it will be noted from Fig. 26, are so constructed that they will not interfere with the electro rolls during the removal of the parts.

The mechanism for printing upon and feeding the inserted sales slips will now be described. Referring to Fig. 22, it will be seen that these mechanisms are located substantially below the type line and are suitably supported in side frame 11, and the auxiliary supporting frame 1290, Figs. 27 and 35. A drive shaft 1291 (Fig. 22) is provided, which shaft, like shaft 1135 associated with the check printing mechanism, drives the operating parts for the slip printing mechanism through a clutch. This clutch, like that associated with the check printing mechanism, is also controlled by the transaction bank of keys. As shown in Figs. 17 and 18, the bushing 1165 fixed to the shaft 269 of the transmission line, is provided with a second cam 1292 which is similar in construction to cam 1164. The raised portions of cams 1164 and 1292 are not in alinement, however. The purpose of arranging the cams in this manner will be clearly pointed out hereinafter. Cam 1292 cooperates with a lever 1293 pinned to shaft 1294, which shaft is journalled in side frame 11 and auxilially supporting frame 1290, as shown in Fig. 17. Pinned to shaft 1294 is a rearwardly extending arm 1295 (Figs. 18 and 20), to which is pivoted the lower end of a link 1296, whose function is similar to that of the link 1158 for controlling the clutch mechanism associated with the check printing mechanism. The various elements comprised in the clutch mechanism proper associated with the slip printing mechanism are the same in all respects as those previously described in connection with the check printing mechanism and therefore a detailed description of the same is unnecessary. However, the structure and operation of the mechanism will be reviewed and in so doing the corresponding parts of the two clutches will be similarly numbered. It will be remembered that the raised portions of cam 1164 associated with the check printing mechanism are so adjusted that for cash, received on account, and paid out transactions they will engage the projection 1163 provided on lever 1161 and through the link 1158 gear 1145 (Fig. 19) will be positively connected to shaft 1135 (Fig. 18) so that upon operation of the machine for these transactions, a check will be issued. Cam 1292 associated with the slip printing mechanism, is so positioned on bushing 1165 that for charge transactions the raised portion thereof will engage a projection provided on arm 1293 with the result that printing will occur upon inserted slips for those transactions. When the projection on lever 1293 engages the raised portion of cam 1292 shaft 1294 will be rocked in a clockwise direction. By this action arm 1295 will also be rocked in a clockwise direction carrying link 1296 downwardly. Link 1296 is connected at its upper end to a cam plate 1159' (Fig. 20) having a cam portion 1160' normally engaging a stud 1152' provided at the lower end of a pawl 1148', pivoted at 1150' to a disc 1145' fixed to shaft 1291. Stud 1152' projects through a radial slot 1153' provided in disc 1145'. Normally stud 1152' engages in a notch 1154' provided in a stationary disc 1155'. The disc 1155' is held stationary by being connected by a pin 1156' to a bar 1297 supported on the shafts 1291 and 1294. A hub 1146' is fixed to a disc 1245 (Fig. 17) which in turn is fixed to cam 1132. Hub 1146' is provided with a projection 1147' which is adapted to be engaged by the hook provided at the end of pawl 1148'. From the construction of the parts described it is clear that when a charge key is depressed, and the machine is then operated, shaft 269 (Fig. 18) will be rotated in a counterclockwise direction, bringing the raised portion of cam 1292 into engagement with lever 1293 and rocking shaft 1294 in a clockwise direction. This causes arm 1295, which also is fixed to shaft 1294, to rock downwardly, thereby causing cam plate 1159' (Figs. 17 and 20) to cam lever 1148' in a counterclockwise direction to engage the hook portion thereof with the projection 1147' provided on hub 1146'. Now, when disc 1145' is rotated by movement of plate 1245, through the clutch mechanism just described, the slip printing and feeding mechanism will be actuated. From the construction of cam 1292 (Fig. 18), it is seen that for cash, received on account, paid out, and no sale transactions, shaft 1294 will not be rocked in the manner just described and consequently, the slip printing mechanism will not be enabled for operation. The driving disc 1245 (Fig. 17), as was pointed out before, is fixed to the cams 1132, which cams, it will be remembered, are fixed to sleeve 1133. It will be remembered that cams 1132 are given a complete rotation at each operation of the machine for the purpose of feeding the inking ribbon, consequently, disc 1245 will also be rotated through a complete revolution at each operation of the machine. Sleeve 1133 receives one end of shaft 1291, as shown in Fig. 17. The other end of shaft 1291 is journalled in the auxiliary supporting plate 1290. Mounted on a cross rod 1300 (Figs. 22 and 27), is a pair of arms 1301 which carry at their forward end a platen 1302. An impression block 1303 underlying all of the type wheels of the type line is fitted in the channel of platen 1302. Platen 1302 is guided for vertical reciprocatory movement in grooves 1304 and 1305, as shown in Fig. 27; groove 1304 being provided in the auxiliary plate 1290, while groove 1305 is provided in the bracket 1306 attached to the supporting frame 11. Arms 1301 are connected intermediate their ends by a pin 1307 carrying an anti-friction roller 1308. A cam 1309 provided with two raised cam portions 1310 and 1311 is fixed to shaft 1291. This cam engages anti-friction roller 1308 and is provided to actuate the platen 1302 to effect printing impressions upon the inserted sales slips. In the illustrated machine, since cam 1309 is provided with the two cam portions 1310 and 1311, two printed impressions will be effected upon the type, one set being provided for printing upon issued checks, the other set being provided for printing upon inserted slips, a platen for effecting printing upon issued checks from one of said sets of type, manual means for regulating the number of impressions to be made upon said checks, comprising a lever, a member having a cam surface thereon, an adjustable cam carried by said member, means for rotating said member at each check issuing operation of the machine, said parts being so constructed and arranged that when said lever is in one position, said adjustable cam and said cam surface will successively operate the platen to effect two printing impressions upon the issued checks and when said lever is moved to another position, said adjustable cam will be rendered inoperative, whereby but a single impression will be made upon the check by said same surface, a second platen for printing upon inserted slips, and means for actuating said platen twice during an operation of the machine to effect duplicate printing upon the inserted slips from the other set of types.

2. In a machine of the class described, the combination of a plurality of type carriers having duplicate sets of type, a main operating mechanism, means operated by the main operating mechanism for effecting two printing impressions from one of said sets of type upon one record medium and means for effecting one or more printing impressions from the other set of type upon another record medium, said last mentioned means comprising a cam, carrying a fixed cam portion and a movable cam portion, and manual means for controlling the effectivity of said movable cam portion.

3. In a machine of the class described, the combination of a plurality of type carriers, a main operating mechanism, a member operated by said main operating mechanism having a fixed cam surface and an adjustable cam surface, normally ineffective means for controlling printing upon a record medium from said type carriers, key controlled means for conditioning said printing means for operation, manual means for predetermining the effectivity of said movable cam surface, and a second manipulative device for controlling the effectivity of said key controlled means.

4. In a machine of the class described, the combination of a plurality of feeding rollers arranged in pairs for feeding a record medium, one roller of each pair being provided with adjustable means to vary the pressure exerted thereby upon its cooperating roller, a locking plate, means provided on said locking plate for actuating said adjustable means, said plate being provided with means cooperating with the supporting means for two of said rollers, and a supporting plate for said rollers, said parts being so constructed that upon movement of said locking plate out of engagement with said supporting means, the supporting plate and some of said rollers may be removed from the machine as a unit.

5. In a machine of the class described, a pair of electro rolls, a pressure roll cooperating with each of said electro rolls, an inking roll engaging each of said electro rolls, a supporting plate supporting all of said rolls at one end thereof, said pressure rolls being provided with adjustable means for regulating the pressure exerted thereby upon its cooperating electro roll, a locking plate having means engaging the supporting means for each of said electro rolls, means carried by said locking plate engaging said adjustable means so that when said locking plate is moved, adjustment of said pressure rolls will be effected, said parts being so constructed and arranged that upon movement of said locking plate to disengage the same from the supporting means for the electro rolls, the pressure rolls will be moved out of engagement therewith, and the supporting plate may then be removed from the machine carrying said pressure rolls and said inking rolls therewith.

6. In a machine of the class adapted to issue single checks or stub checks, the combination of perforating mechanism; severing mechanism; rockable means supporting said perforating mechanism and severing mechanism; operating means including a member for rocking the supporting means in one direction to cause the perforating means to perforate a check and for rocking the supporting means in another direction to cause the severing mechanism to cut off a check; a settable coupling member connected to said supporting means and variously cooperable with said member, said coupling means when set to one position connecting the supporting means to the member for rocking operation in both directions so that the perforating means can perforate a check and the severing means can cut off the check, and said coupling means when set to another position, so connecting the supporting means to the member to allow an idle operation of the member to prevent the perforating means from perforating the check, and to operate the supporting means to cause the severing means to cut off the check; and means to control the setting of the coupling means.

7. In a machine adapted to issue single checks or stub checks, the combination of perforating means; severing means; common supporting means for said perforating means and said severing means; an operating member movable in two directions and having an irregular slot therein; coupling means connected to said support and having a pin variously positioned in said slot, said pin in one position connecting the support to the member for operation thereby to cause the perforating means and severing means to perforate and cut off a check and said pin in another position causing an idle operation of the member in one direction to prevent the perforation of a check and to cause an operation of the support by the member in the other direction to cause the severing means to cut off a check; and means to control the positioning of the pin in the slot.

8. In a machine of the class described operable to issue checks and having type carriers and co-operating platen mechanism, the combination of a rotatable shaft; a member rotatable with said shaft and having a fixed cam surface thereon for operating the platen mechanism during each rotation of the member and having thereon an adjustable element having a cam surface, which element is controllable to cause an additional operation of the platen mechanism as the member rotates; a control cam, loosely mounted on the shaft, cooperating with the adjustable element, and positionable to cause the element to operate the platen as the member rotates; and means to position the control cam.

9. In a machine of the class described adapted to make one or two impressions on record material and having type carriers and platen mechanism cooperating with the type carriers, the combination of a rotatable shaft; a member connected to rotate with said shaft and having a fixed cam surface thereon engageable with the platen mechanism to operate the platen mechanism to cause an impression to be made on said record material during each rotation of the shaft; a shiftable element carried by said member and operable only when shifted to effective position adjacent the platen mechanism to operate the platen mechanism to cause a second impression to be made on said record material; a control cam loosely mounted on said shaft, settable to a plurality of positions, and engageable by said element as the member carries the element past the control cam to move the element to effective position at different points in the rotation of the member; and means to set the control cam in the position where it will move the element to effective position adjacent the platen mechanism.

CHARLES W. GREEN.